United States Patent
Li et al.

(10) Patent No.: US 12,379,910 B2
(45) Date of Patent: Aug. 5, 2025

(54) METHOD AND APPARATUS FOR CONTROLLING INSTALLATION OF APPLICATION PROGRAM

(71) Applicant: HUAWEI TECHNOLOGIES CO., LTD., Guangdong (CN)

(72) Inventors: Shanfu Li, Shenzhen (CN); Li Qian, Shenzhen (CN); Mingjie Dong, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 52 days.

(21) Appl. No.: 18/070,835

(22) Filed: Nov. 29, 2022

(65) Prior Publication Data
US 2023/0093701 A1    Mar. 23, 2023

Related U.S. Application Data

(63) Continuation of application No. PCT/CN2021/096808, filed on May 28, 2021.

(30) Foreign Application Priority Data

May 30, 2020   (CN) .......................... 202010480892.5

(51) Int. Cl.
G06F 8/61    (2018.01)
G06F 1/16    (2006.01)

(52) U.S. Cl.
CPC ................ *G06F 8/61* (2013.01); *G06F 1/163* (2013.01)

(58) Field of Classification Search
CPC .................................................. G06F 8/60–66
(Continued)

(56) References Cited

U.S. PATENT DOCUMENTS

2004/0111288 A1*  6/2004  Lee .................. G06Q 30/02
                                                    705/28
2014/0006964 A1*  1/2014  Pan .................. G06F 3/0484
                                                    715/738
(Continued)

FOREIGN PATENT DOCUMENTS

CN    103777962 A    5/2014
CN    105468417 A    4/2016
(Continued)

OTHER PUBLICATIONS

Wearable computer, Wikipedia, Apr. 2020, 14 pages, [retrieved on Sep. 6, 2024], Retrieved from the Internet: <URL:https://web.archive.org/web/20200424035817/https://en.wikipedia.org/wiki/Wearable_computer>.*
(Continued)

*Primary Examiner* — Geoffrey R St Leger
(74) *Attorney, Agent, or Firm* — WOMBLE BOND DICKINSON (US) LLP

(57) ABSTRACT

A method and apparatus for controlling installation of an application program are described. In an embodiment, a first terminal device receives a first operation of a user, where the first operation is triggered by the user for a target application on the first terminal device; the first terminal device displays a first window in response to the first operation, where the first window includes at least one first identifier, and the at least one first identifier corresponds to at least one second terminal device; and the first terminal device detects that a target first identifier in the first window is selected, and sends first indication information to a target second terminal device that is in the at least one second terminal device and that is corresponding to the target first identifier, to indicate the target second terminal device to install the target application.

20 Claims, 38 Drawing Sheets

(58) Field of Classification Search
USPC .................................................. 717/168–178
See application file for complete search history.

(56) References Cited

U.S. PATENT DOCUMENTS

| | | | |
|---|---|---|---|
| 2014/0075169 A1* | 3/2014 | Andrews ............... | G06F 9/4416 |
| | | | 713/2 |
| 2016/0299736 A1* | 10/2016 | Bates .................. | G06F 3/04847 |
| 2018/0189044 A1* | 7/2018 | Das ........................ | H04W 4/50 |

FOREIGN PATENT DOCUMENTS

| | | | | |
|---|---|---|---|---|
| CN | 105511894 A | * | 4/2016 | |
| CN | 105549869 A | | 5/2016 | |
| CN | 106293563 A | | 1/2017 | |
| CN | 111897544 A | | 11/2020 | |
| WO | WO-0036503 A2 | * | 6/2000 | ............... G06F 8/63 |
| WO | WO-0169384 A2 | * | 9/2001 | ............... G06F 8/65 |
| WO | WO-2013097202 A1 | * | 7/2013 | ........... G06F 17/227 |
| WO | WO-2021172815 A1 | * | 9/2021 | ............. G06F 21/12 |

OTHER PUBLICATIONS

Jackson, Wallace, Chapter 1: Smartwatch Design History, Concepts, Terms, and Installation, Smartwatch Design Fundamentals, 2019, 32 pages, [retrieved on Mar. 15, 2024], Retrieved from the Internet: <URL: https://link.springer.com/chapter/10.1007/978-1-4842-4369-5_1>.*

* cited by examiner

METHOD AND APPARATUS FOR CONTROLLING INSTALLATION OF APPLICATION PROGRAM

CROSS-REFERENCE TO RELATED APPLICATIONS

This application is a continuation of International Application No. PCT/CN2021/096808, filed on May 28, 2021, which claims priority to Chinese Patent Application No. 202010480892.5, filed on May 30, 2020. The disclosures of the aforementioned applications are hereby incorporated by reference in their entireties.

TECHNICAL FIELD

This disclosure relates to the field of terminal technologies, and in particular, to a method and apparatus for controlling installation of an application program.

BACKGROUND

With development of electronic technologies, there are more types of terminal devices, for example, a smartphone and a wearable device. A common wearable device is a smartwatch.

Currently, an application (App) is bearer for directly implementing functions such as photographing, multimedia playing, and network connection in various modes on a smartphone and a wearable device.

Currently, a screen size of a wearable device is small for portability, and a processing capability of a general wearable device is lower than a processing capability of a smartphone. The foregoing features determine that a manner of installing an application program on the wearable device is different from a manner of installing an application program on a conventional smartphone, and user experience is also greatly different. For example, because a screen of the smartwatch is small, a user cannot perform precise control on a touchscreen of the smartwatch.

With development and popularization of wearable devices, a user has an increasingly high requirement on convenience of installing an application program on the wearable device. Currently, it is inconvenience to install an application program on the wearable device, and it is complex to operate.

SUMMARY

This disclosure provides a method and apparatus for controlling installation of an application program, to simplify a manner of installing an application program on a terminal device, and flexibly manage the terminal device.

According to a first aspect, this disclosure provides a method for controlling installation of an application program. The method may be implemented by a first terminal device, and the method includes: The first terminal device receives a first operation of a user, where the first operation is triggered by the user for a target application on the first terminal device; the first terminal device displays a first window in response to the first operation, where the first window includes at least one first identifier, and the at least one first identifier corresponds to at least one second terminal device; the first terminal device detects that a target first identifier in the first window is selected, where the target first identifier is one of the at least one first identifier; and the first terminal device sends first indication information to a target second terminal device that is in the at least one second terminal device and that is corresponding to the target first identifier, where the first indication information indicates the target second terminal device to install the target application.

According to the foregoing method, the user may directly trigger the first operation on an icon of the target application displayed on the first terminal device, to select one or more target applications on the first terminal device to be installed on the second terminal device, and the user does not need to control installation of an application program on the second terminal device by using a dedicated application program for managing the second terminal device. Therefore, a manner of controlling installation of an application program on the second terminal device is simplified, and installation of an application program on the second terminal device can be flexibly controlled.

In an embodiment, the first terminal device displays the first window on an icon of the target application in a pop-up window manner; or the first terminal device displays the first window at a preset location on a display screen.

According to the foregoing method, a manner of displaying the first window by the first terminal device is more flexible, different operation habits of users are met, and user experience is improved.

In an embodiment, the at least one second terminal device is separately bound (e.g., connected or paired) to the first terminal device.

According to the foregoing method, the second terminal device may be a device previously connected to the first terminal device, the second terminal device may be a device connected to the first terminal device, the second terminal device is a preset device, or the second terminal device is a device scanned and found by the first terminal device. This method is applicable to a wide range of scenarios in which the first terminal device controls installation of application programs on second terminal devices that have different binding relationships (e.g., connected or paired) with the first terminal device.

In an embodiment, the first identifier has one display state; or the first identifier has two display states, and when a second terminal device corresponding to the first identifier is connected to the first terminal device, the first identifier in the first window is in a first display state; or when a second terminal device corresponding to the first identifier does not establish a connection to the first terminal device, the first identifier in the first window is in a second display state.

According to the foregoing method, the first identifier has different functions in different display states, and a connection status between the second terminal device corresponding to the first identifier and the first terminal device may be represented by using different display states. A manner of displaying the first identifier is more flexible, so that the user can check the connection status between the second terminal corresponding to the first identifier and the first terminal device. Functions are more diversified, and user experience is improved.

In an embodiment, the first identifier has one display state; and after the first terminal device detects that the target first identifier in the first window is selected, and before the first terminal device sends the first indication information to the target second terminal device corresponding to the target first identifier, the first terminal device detects that the first terminal device is connected to the target second terminal device; or the first terminal device detects the first terminal device does not establish a connection to the target second terminal device; the first terminal device sends second indication information to the target second terminal device, where the second indication information indicates the target second terminal device to establish a connection to the first terminal device; and the first terminal device detects that the first terminal device is connected to the target second terminal device.

According to the foregoing method, when the first terminal device responds to an operation that the target first identifier is selected, if the target second terminal device corresponding to the target first identifier is not connected to the first terminal device, the first terminal device may send, to the target second terminal device, second indication information for establishing a pairing connection, to establish a connection between the target second terminal device and the first terminal device, and after the connection is successfully established, indicate the second terminal device to install the target application. This meets requirements for controlling the second terminal device in different scenarios, and simplifies pairing and connection operations when the second terminal device is not connected to the first terminal device.

In an embodiment, the first terminal device displays a second window in response to the first operation, where the second window includes a second identifier; and the first terminal device displays the first window in response to a selection operation performed by the user on the second identifier.

According to the foregoing method, when there are a plurality of first identifiers, the first identifiers may be displayed in a plurality of windows, and a neat user interface can facilitate a user operation and improve user experience.

In an embodiment, before the first terminal device sends the first indication information to the target second terminal device, or after the first terminal device sends the first indication information to the target second terminal device, the first terminal device sends an installation package of the target application to the target second terminal device.

Alternatively, before the first terminal device sends the first indication information to the target second terminal device, or after the terminal device sends the first indication information to the target second terminal device, the first terminal device sends related information of the target application to the target second terminal device, where the related information of the target application includes a name of the target application, or includes a name and version information of the target application.

In an embodiment, before the first terminal device sends the installation package of the target application to the target second terminal device, the first terminal device downloads the installation package of the target application, where the installation package is in a format supported by the target second terminal device; or the first terminal device converts a format of the installation package that is of the target application and that is adapted to the first terminal device into a format supported by the target second terminal device.

In an embodiment, before the first terminal device sends the first indication information to the target second terminal device, or after the first terminal device sends the first indication information to the target second terminal device, the first terminal device sends configuration information of the target application to the target second terminal device, so that the target second terminal device configures the installed target application based on the configuration information of the target application.

According to the foregoing method, the second terminal device may configure the target application program based on the configuration information from the first terminal device, to improve efficiency of configuring an application program on the second terminal device, simplify a user operation, and improve use experience.

According to a second aspect, an embodiment of this application provides an electronic device, including a touch-screen, a display screen, a processor, and a memory. The memory is configured to store one or more computer programs. When the one or more computer programs stored in the memory are executed by the processor, a terminal device is enabled to implement the method in any possible design of any one of the foregoing aspects.

According to a third aspect, an electronic device is further provided, including modules/units configured to perform the method in any one of the first aspect or the possible designs of the first aspect. The modules/units may be implemented by hardware, or may be implemented by hardware executing corresponding software.

According to a fourth aspect, a chip is further provided. The chip is coupled to the memory in the electronic device according to the first aspect, so that when the chip is run, the chip invokes program instructions stored in the memory, to implement the method provided in the first aspect.

According to a fifth aspect, a computer-readable storage medium is further provided. The computer-readable storage medium includes a computer program, and when the computer program runs on an electronic device, the electronic device is enabled to perform the method according to the first aspect.

According to a sixth aspect, a computer program product is further provided, including instructions, and when the instructions are run on a computer, the computer is enabled to perform the method provided in the first aspect.

For beneficial effects of the second aspect to the sixth aspect, refer to beneficial effects of the technical solutions provided in the first aspect. Details are not described herein again.

BRIEF DESCRIPTION OF DRAWINGS

FIG. 10a-1 and FIG. 10a-2 are schematic diagrams of a group of interfaces for displaying a first identifier according to an embodiment of this disclosure;

FIG. 10*b*-1 Optionally, in the foregoing operation 2, FIG. 10*b*-2, and FIG. 10*b*-3 are schematic diagrams of a group of interfaces for displaying a first identifier according to an embodiment of this disclosure;

DESCRIPTION OF EMBODIMENTS

To make the objectives, technical solutions, and advantages of this disclosure clearer, the following further describes this disclosure in detail with reference to the accompanying drawings. A specific operation method in a method embodiment may also be applied to an apparatus embodiment or a system embodiment.

Figure 1:
FIG. 1 is a schematic diagram of a system architecture according to an embodiment of this disclosure.

FIG. 1 is a schematic diagram of an architecture of a communication system to which an embodiment of this disclosure is applicable. The communication system includes a mobile terminal 10 and a wearable device 20.

One or more application programs may be installed on the mobile terminal 10 and the wearable device 20. Currently, a dedicated application program for managing the wearable device 20 may be installed on the mobile terminal 10 (for example, when the wearable device 20 is a watch, refer to FIG. 1, an application program used by a user to manage a watch is named watch). The user may operate and control the dedicated application program on the mobile terminal 10, to manage the application program on the wearable device 20, for example, control installation of an application program on the wearable device 20. In other words, the user may implement remote control on the wearable device 20 on the mobile terminal 10, and the user does not need to perform a manual operation on the wearable device 20.

It should be understood that before the wearable device 20 is controlled by using the mobile terminal 10, the mobile terminal 10 and the wearable device 20 may be paired, and a connection is established through pairing. To be specific, the mobile terminal 10 and the wearable device 20 can communicate with each other.

To make this disclosure understood more easily, the following provides explanations on some common descriptions in embodiments of this disclosure. It should be noted that the explanations are not considered as a limitation on the protection scope of this disclosure.

1. Terminal Device

In embodiments of this disclosure, a terminal device includes a mobile terminal and a wearable device, may be a device that provides a user with voice and/or data connectivity, a handheld device with a wireless connection function, or another processing device connected to a wireless modem, for example, a mobile phone (or referred to as a "cellular" phone), and may be a portable, pocket-sized, handheld, computer built-in, or vehicle-mounted mobile apparatus.

In embodiments of this disclosure, mobile terminals may communicate with each other, and a mobile terminal may communicate with a wearable device. A communication standard that may be used includes but is not limited to various near field communication standards such as Bluetooth, Near Field Communication (NFC), ZigBee, infrared data transmission (IrDA), and Wireless Fidelity (WiFi). Alternatively, a communication standard used when a mobile terminal communicates with a network device may be used between a mobile terminal and a wearable device. In a future evolved 5th Generation (5G) mobile communication system, terminal devices may communicate with each other in a cellular network-based device to device (D2D) manner. Any standard may be used provided that communication between two terminals can be implemented.

2. Mobile Terminal

In embodiments of this disclosure, an example of a mobile terminal is a smartphone. Optionally, the smartphone has a large display screen, such as a 2.4 inch, 3.1 inch, 4 inch, 5.5 inch, or 6 inch display screen. The mobile terminal may alternatively be a tablet computer, a PDA (Personal Digital Assistant), a POS (Point of Sales), a vehicle-mounted computer, or the like.

Figure 2:
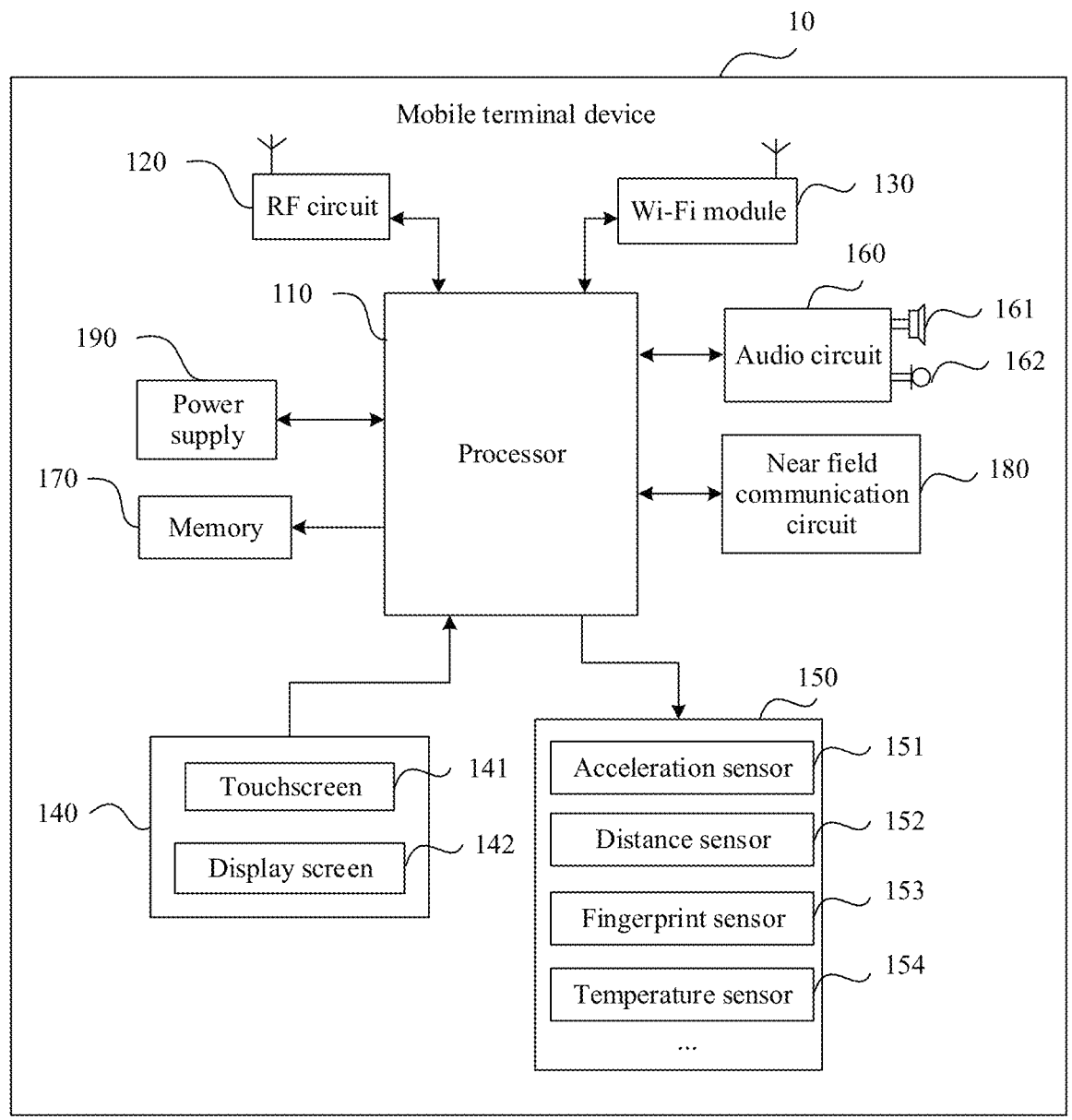
FIG. 2 is a schematic diagram of a structure of a mobile terminal device according to an embodiment of this disclosure.

The following uses the mobile terminal 10 as an example to describe the embodiments in detail. It should be understood that the mobile terminal 10 shown in FIG. 2 is merely an example, and the mobile terminal 10 may have more or fewer components than components shown in FIG. 2, may combine two or more components, or may have different component configurations. Various components shown in the figure may be implemented in hardware including one or more signal processing and/or application-specific integrated circuits, software, or a combination of hardware and software.

FIG. 2 is a schematic diagram of an optional hardware structure of the mobile terminal 10. As shown in FIG. 2, the mobile terminal 10 may include a processor 110, a radio frequency (RF) circuit 120, a Wi-Fi module 130, a display unit 140, a memory 170, an audio circuit 160 and a microphone and a speaker that are connected to the audio circuit 160, a sensor 150, a near field communication circuit 180, and the like.

The processor 110 may complete processing and control functions, and control other components and units in the mobile terminal 10. The processor 110 may control work of other components and units by invoking a program in the memory 170. The processor 110 may include one or more general-purpose processors, and may further include one or more digital signal processors (DSP).

The RF circuit 120 or the Wi-Fi module 130 receives and transmits a radio signal. The mobile terminal 10 may access a server or another terminal by using the RF circuit 120 or the Wi-Fi module 130, to obtain data on the server or the another terminal, for example, access an application server on the Internet, to obtain data on the application server.

The wearable device 20 may also communicate with the mobile terminal 10 by using the RF circuit 120 or the Wi-Fi module 130, which is the foregoing D2D communication.

When the RF circuit 120 receives and transmits a radio signal, communication standards that may be used include but are not limited to: Global System for Mobile Communication (GSM), Code Division Multiple Access (CDMA) IS-95, Code Division Multiple Access (CDMA) 2000, Time Division-Synchronous Code Division Multiple Access (TD- SCDMA), Wideband Code Division Multiple Access (WCDMA), Time Division Duplex-Long Term Evolution (TDD LTE), Frequency Division Duplex-Long Term Evolution (FDD LTE), Long Term Evolution-advanced (LTE-advanced), personal handheld telephone system (PHS), and Worldwide Interoperability for Microwave Access (WiMAX) and various future evolved wireless communication standards in future.

Wi-Fi is a short-distance wireless transmission technology. When the Wi-Fi module 130 receives and transmits a radio signal, the Wi-Fi module 130 may use a Wi-Fi wireless communication standard stipulated in the 802.11 protocol series.

In addition, the mobile terminal 10 may also communicate with the wearable device 20 by using the RF circuit 120 or the Wi-Fi module 130.

The near field communication circuit 180 may receive and transmit a radio signal. The mobile terminal 10 may also perform near field communication with the wearable device 20 by using the near field communication circuit 180.

The display unit 140 may be further configured to display information entered by a user or information provided for the user, and graphical user interfaces (GUI) of various menus of the mobile terminal 10. Specifically, the display unit 140 may include a display screen 142 disposed on a front face of the mobile terminal 10. The display screen 142 may be configured in a form of a liquid crystal display, a light emitting diode, or the like. The display unit 140 may be configured to display image data generated by the processor 110. Optionally, the display screen 142 may have a touch control function. In this case, the display screen 142 is a touch display screen, and is configured to: receive a screen touch operation of a user, and provide input operation information of the user to the processor 110.

A touchscreen 141 may cover the display screen 142, or the touchscreen 141 and the display screen 142 may be integrated to implement input and output functions of the mobile terminal 10. After the touchscreen 141 and the display screen 142 are integrated, the touchscreen 141 may be referred to as a touch display screen. In this disclosure, the display unit 140 may display an application program and a corresponding operation.

The mobile terminal 10 may further include at least one sensor 150, for example, an acceleration sensor 151, a distance sensor 152, a fingerprint sensor 153, and a temperature sensor 154. The mobile terminal 10 may be further configured with other sensors such as a gyroscope, a barometer, a hygrometer, a thermometer, an infrared sensor, a light sensor, and a motion sensor.

The audio circuit 160, a speaker 161, and a microphone 162 may provide an audio interface between the user and the mobile terminal 10.

The memory 170 may be configured to store a program, and the stored program may be used to control the foregoing units and components. In addition, the memory 170 may further store intermediate variable data and the like that are generated when the processor 110 runs.

The mobile terminal 10 further includes a power supply 190 (such as a battery) that supplies power to each component. The power supply may be logically connected to the processor 110 by using a power management system, to implement functions such as charging management, discharging management, and power consumption management by using the power management system. The mobile terminal 10 may be further configured with a power button that is configured to perform functions such as power-on and power-off of the terminal, and screen locking.

3. Wearable Device

In embodiments of this disclosure, examples of wearable devices may include but are not limited to wearable devices such as a smart band, a smartwatch, a wristband, smart glasses, and a necklace. Optionally, the wearable device has a small display screen, for example, 1.5 inches or 1.73 inches.

For a hardware structure of the wearable device 20, refer to a schematic diagram of a hardware structure of the mobile terminal 10 shown in FIG. 2. Details are not described herein again.

4. Pairing Between a Mobile Terminal and a Wearable Device

The mobile terminal 10 may be paired with the wearable device 20. For example, pairing is performed through the foregoing near field communication. For example, the mobile terminal 10 and the wearable device 20 may exchange information such as device identification and a device type through signaling. For a procedure of the signaling exchange, refer to a current procedure of pairing between the mobile terminal and the wearable device. This is not limited in the present application. After two terminals complete pairing, data transmission may be performed between the two terminals, for example, data transmission in various forms such as a picture, a text, a character, an image, and a data stream.

For example, if the mobile terminal 10 and the wearable device 20 use an Android operating system, the mobile terminal 10 may be paired with the wearable device 20 by using an Android wearable device application (Android Wear App) on the mobile terminal 10. After the wearable device 20 is powered on and initialized, the wearable device 20 directly enters a pairing setting procedure to pair with the mobile terminal 10.

For another example, if the mobile terminal 10 and the wearable device 20 use an iOS operating system, and the wearable device 20 is a smartwatch, the mobile terminal 10 may be paired with the wearable device 20 by using a watch application (Watch App) on the mobile terminal 10. After the wearable device 20 is powered on and initialized, the wearable device 20 directly enters a pairing setting procedure to pair with the mobile terminal 10.

After the mobile terminal 10 and the wearable device 20 are paired, the wearable device 20 may receive a message and/or data from the mobile terminal 10.

It should be noted that the foregoing pairing manner is merely an example. In embodiments of this disclosure, two terminals may be manually paired and connected, or may be paired and connected by using a first identifier. The following provides detailed description, and details are not described herein again.

5. Application Program

An application can provide a corresponding service function for a user. A terminal device may run the application by installing an application program (which may also be referred to as application software) of the application, to implement a service function of the application. For example, for a camera application that has a photographing service function, when a terminal device needs to install camera application software and run the camera application, the terminal device may provide the photographing service function for a user. For another example, for a WeChat application, a QQ application, or the like that has a chat service function, a terminal device needs to install WeChat application software or QQ application software, and run the WeChat application or the QQ application, that is, the terminal device may provide the chat service function for a user.

It should be noted that application software of an application may be developed by a supplier of a terminal device, or developed by an application supplier. This is not limited in this application.

It should be understood that, in embodiments of this disclosure, application programs with a same name or function may be installed on the mobile terminal and the wearable device, but adapted versions of application programs installed on the mobile terminal and the wearable device are different. For example, "WeChat" may be installed on both of the mobile terminal and the wearable device, but a development file of WeChat installed on the mobile terminal is different from a development file of WeChat installed on the wearable device. For example, third-party library files applied to the mobile terminal and the wearable device are different.

It should be understood that the mobile terminal 10 and the wearable device 20 shown in FIG. 1 are merely examples. The mobile terminal may provide services for a plurality of wearable devices. A quantity of wearable devices in the communication system is not limited in this disclosure. In addition, FIG. 1 shows an example in which the mobile terminal 10 is a mobile phone and the wearable device 20 is a smartwatch. However, this disclosure is not limited thereto. The mobile terminal may alternatively be another type of mobile terminal, such as a tablet computer or a vehicle-mounted computer, and the wearable device may alternatively be another type of wearable device, such as a smart band, a wrist strap, or a necklace.

Currently, in an embodiment, a user may manage an application program on a wearable device by using a mobile terminal only after a dedicated application program corresponding to the wearable device is installed on the mobile terminal. However, limited by a function of the dedicated application program, the user can only choose to install all application programs on the mobile terminal on the wearable device, or choose to install the application programs later. Therefore, the user cannot flexibly manage the application program on the wearable device. In another embodiment, an application store may be installed on some wearable devices, and a user may directly download a to-be-installed application program from the application store on the wearable device. However, because a screen size of the wearable device is small, it is still inconvenient for the user to install an application program on the wearable device.

In view of this, an embodiment of this disclosure provides a method for controlling installation of an application program on a wearable intelligent device. The method may be performed by a first terminal device. Specifically, the first terminal device may be the mobile terminal shown in FIG. 1 or FIG. 2, and is used by a mobile terminal to control installation of an application program on a wearable device, or used by the mobile terminal to control installation of an application program on the mobile terminal. The mobile terminal receives a first operation of a user, where the first operation may be triggered by the user for a target application on the mobile terminal, and displays a first window in response to the first operation, where the first window may include one or more first identifiers, and the first identifier corresponds to a second terminal device; and the first terminal device detects that a target first identifier in the first window is selected, and sends first indication information to a target second terminal device corresponding to the target first identifier, where the first indication information indicates the target second terminal device to install the target application. For example, the first terminal device is a mobile phone, and the second terminal device is a smartwatch. The user may control installation of an application on the smartwatch by using the mobile phone, and the user does not need to perform a manual operation on the smartwatch. In addition, the user may flexibly select one or more target applications on the mobile phone, and directly install the target applications on the smartwatch without installing additional software for managing the smartwatch on the mobile phone. Therefore, a manner of installing an application program on the smartwatch (the wearable device) is simplified, and it is more convenient for the user to control installation of an application on the wearable device.

The following describes in detail the technical solutions provided in embodiments of this disclosure with reference to specific accompanying drawings and application scenarios by using an example in which the first terminal device is a mobile phone and the second terminal device is a wearable device. In embodiments of this application, "application" and "application program" are a same concept, and the two may be interchangeably used. In the following, a mobile phone may alternatively be a first terminal device, and a wearable device may alternatively be a second terminal device.

The following provides an example with reference to the application scenario.

Figure 3A:
FIG. 3A, FIG. 3B, and FIG. 3C are schematic diagrams of a group of interfaces according to an embodiment of this disclosure.
Figure 3B:
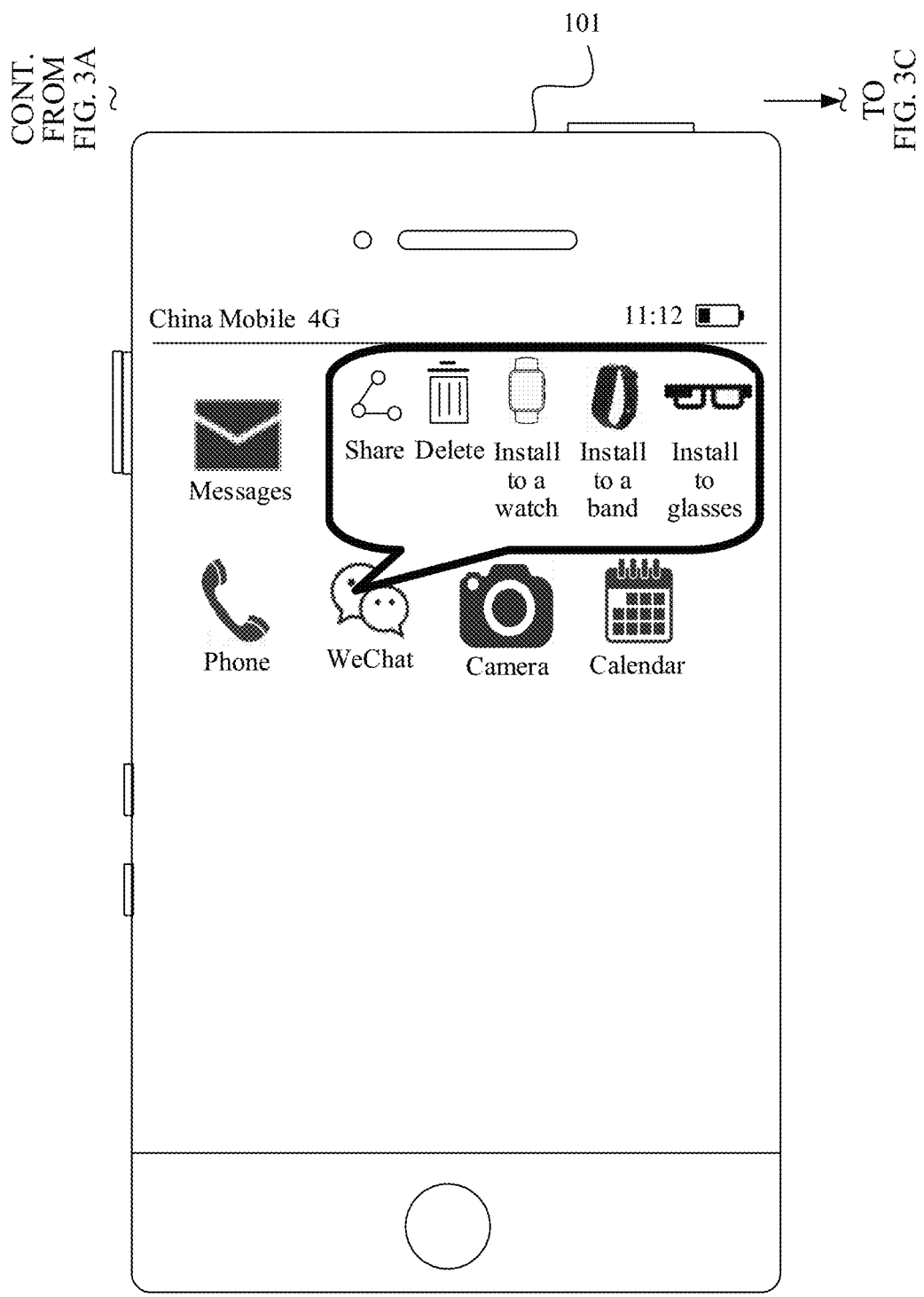
Figure 3C:
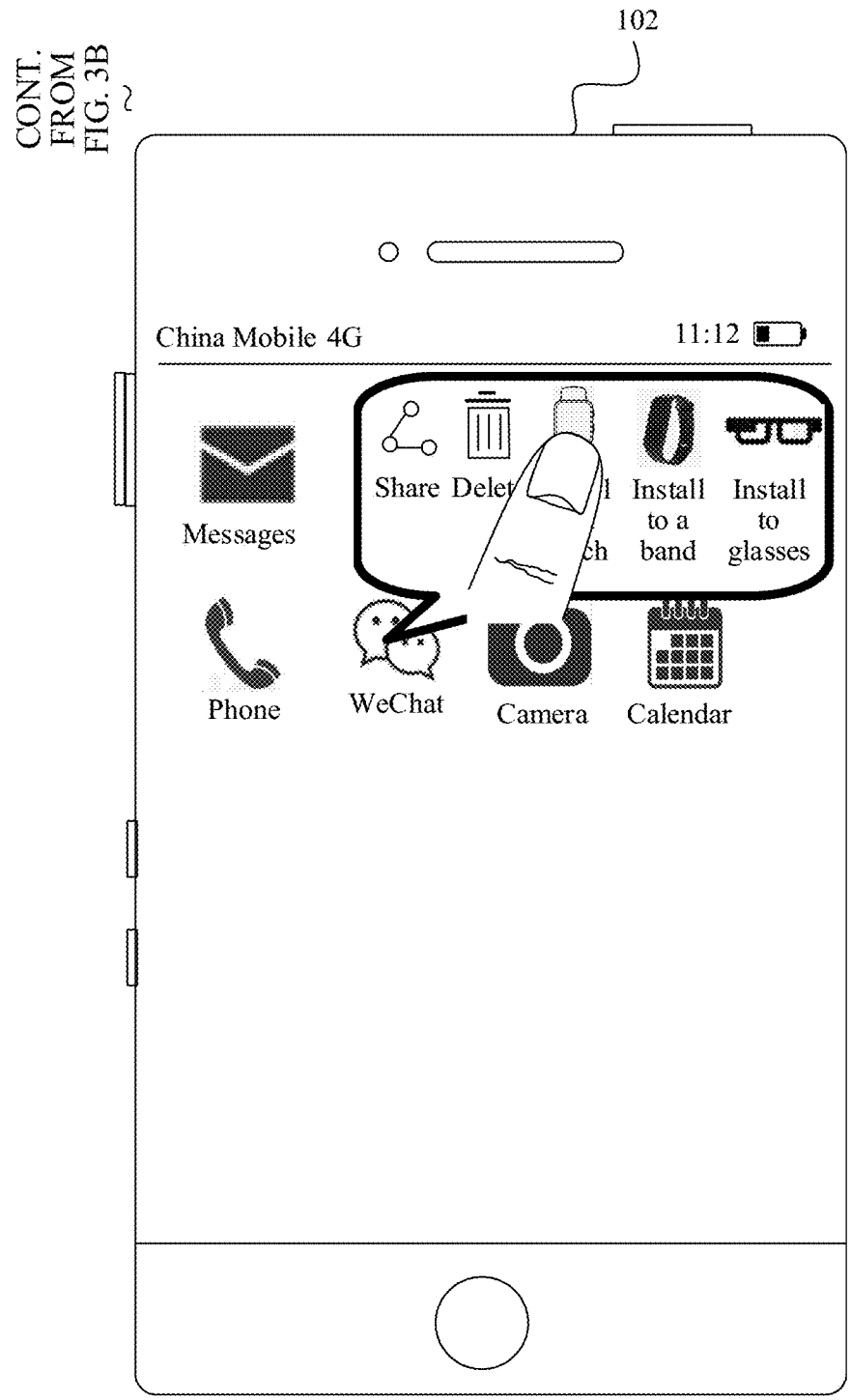

FIG. 3A, FIG. 3B, and FIG. 3C are schematic flowcharts of controlling installation of an application program of a terminal device according to an embodiment of this disclosure. FIG. 3A, FIG. 3B, and FIG. 3C include an interface 100, an interface 101, and an interface 102.

For ease of understanding, the following first briefly describes an application scenario in FIG. 3A, FIG. 3B, and FIG. 3C.

One or more application programs may be installed on a mobile phone, and icons (or application icons for short) of the one or more installed application programs may be displayed on a display screen of the mobile phone. A target application program may be an application program that a user wants to install on the wearable device by using the mobile phone. For example, the target application program may be an application program selected by the user from the installed application programs on the mobile phone, and the application program is an application program that the user wants to install on the wearable device. An icon of the target application program may also be referred to as a target application icon for short.

As shown in FIG. 3A, the mobile phone receives a first operation performed by the user on the target application icon shown in the interface 100 in FIG. 3A. The first operation includes but is not limited to a touch-and-hold operation, a tap operation, a slide operation, and the like.

Figure 4A:
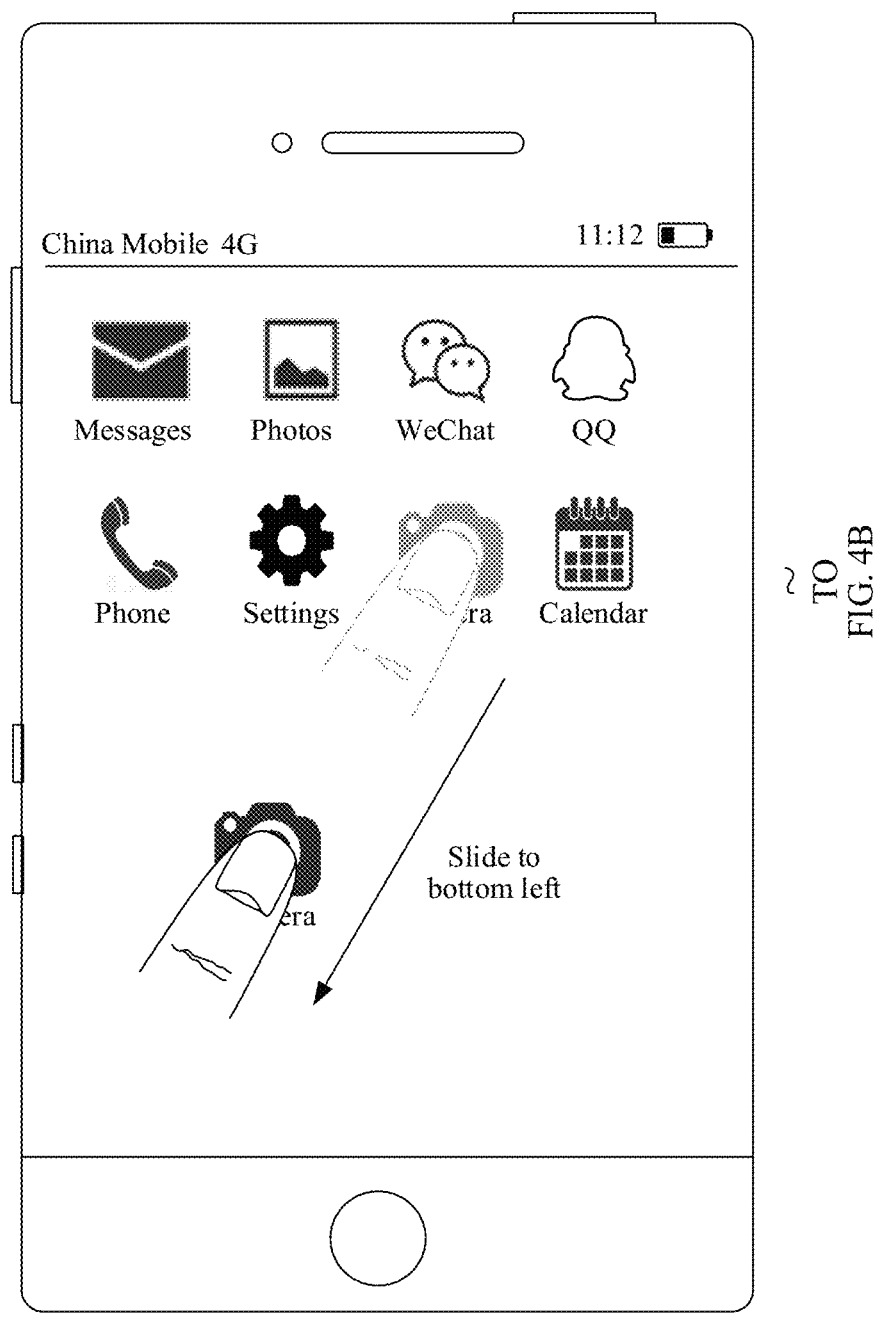
FIG. 4A, FIG. 4B, and FIG. 4C are schematic diagrams of a sliding operation according to an embodiment of this disclosure.
Figure 4B:
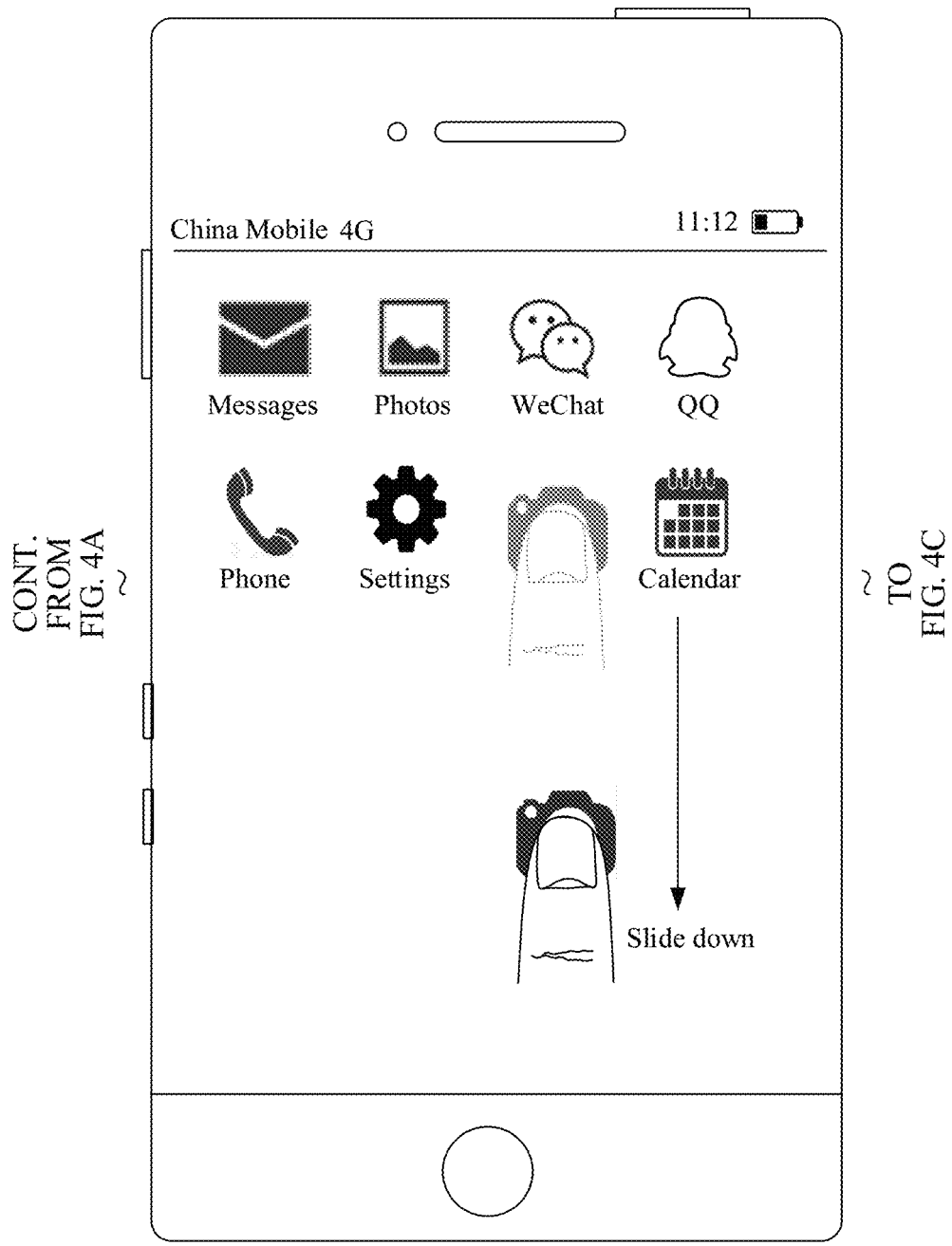
Figure 4C:
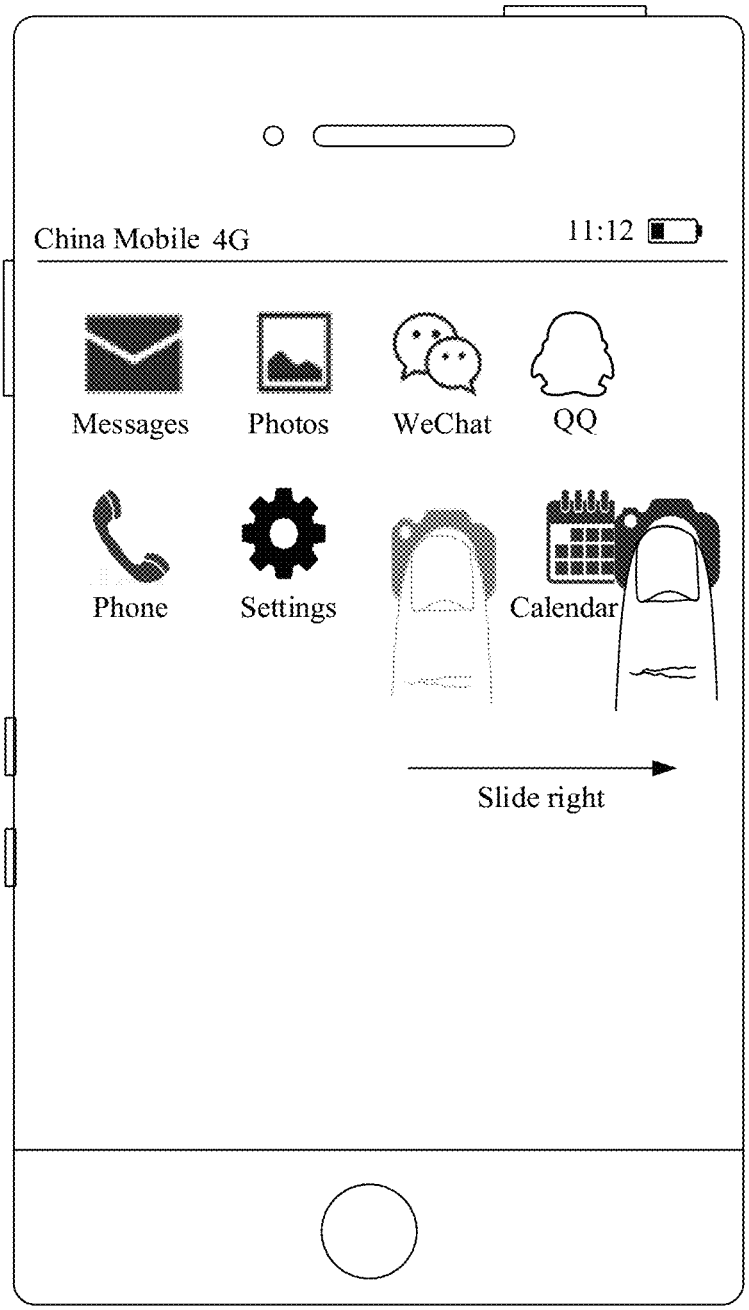

For example, the touch-and-hold operation means that duration for continuously pressing an icon reaches specified duration. For example, the specified duration is 3s, a target application program is WeChat, and the touch-and-hold operation means that the user continuously presses a WeChat icon for 3s or more than 3s. The tap operation may be one tap or a plurality of consecutive taps, for example, a double tap. This is not limited in this embodiment of this disclosure. The sliding operation may be that the user taps and selects a target application icon (a status in this case is that the target application icon may move with sliding of the user) to move in a preset direction, for example, sliding rightward, sliding leftward, or sliding downward. This is not limited in this embodiment of this disclosure. FIG. 4A, FIG. 4B, and FIG. 4C show several sliding operation manners provided in this disclosure.

The mobile phone responds to the first operation triggered by the user on the target application icon in the interface 100, that is, the mobile phone displays a first window. Refer to the interface 101. The first window includes one or more first identifiers, and each first identifier corresponds to at least one wearable device.

Figure 5A:
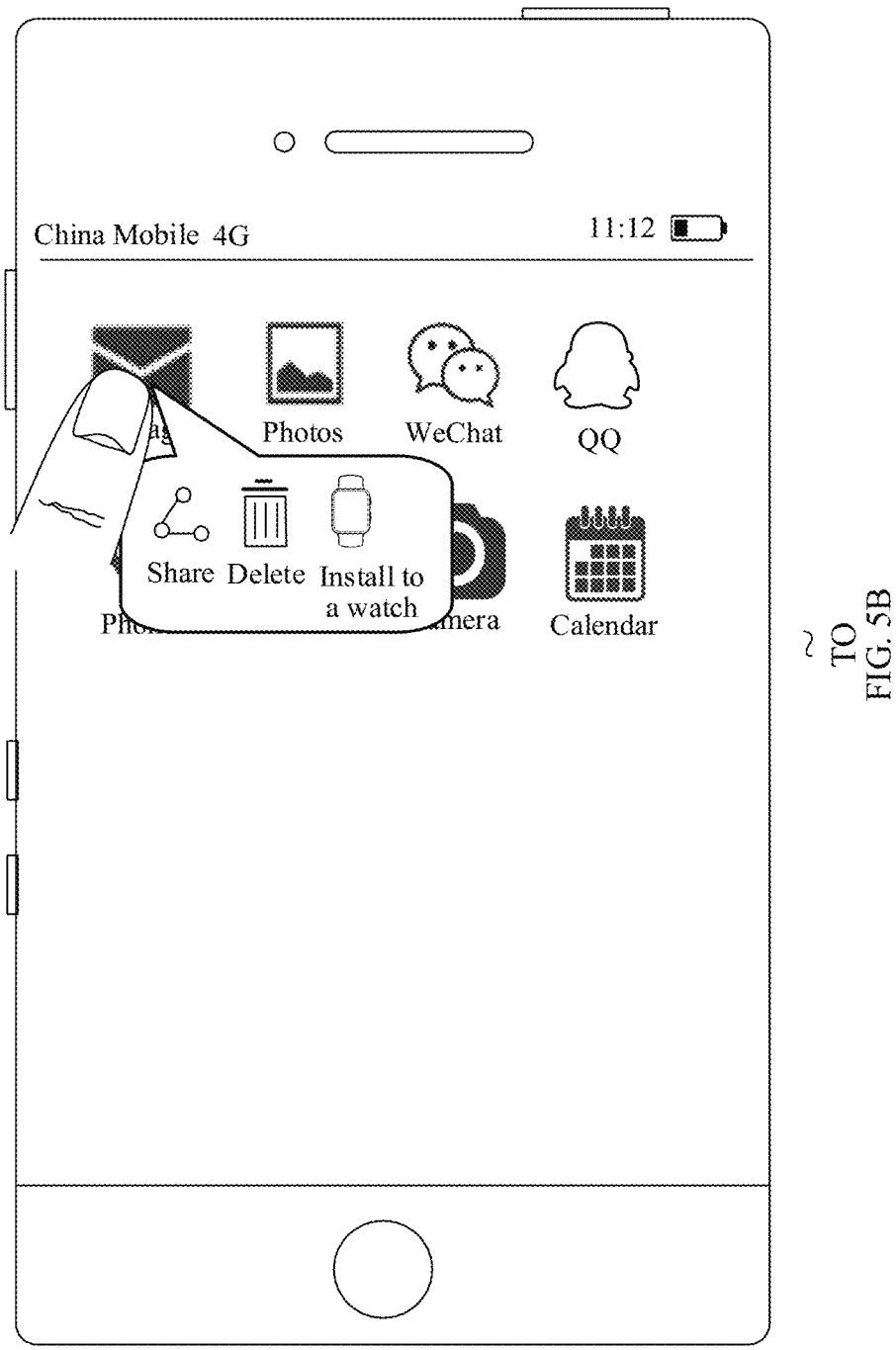
FIG. 5A, FIG. 5B, and FIG. 5C are schematic diagrams of interfaces of a group of first windows at different display locations according to an embodiment of this disclosure.
Figure 5B:
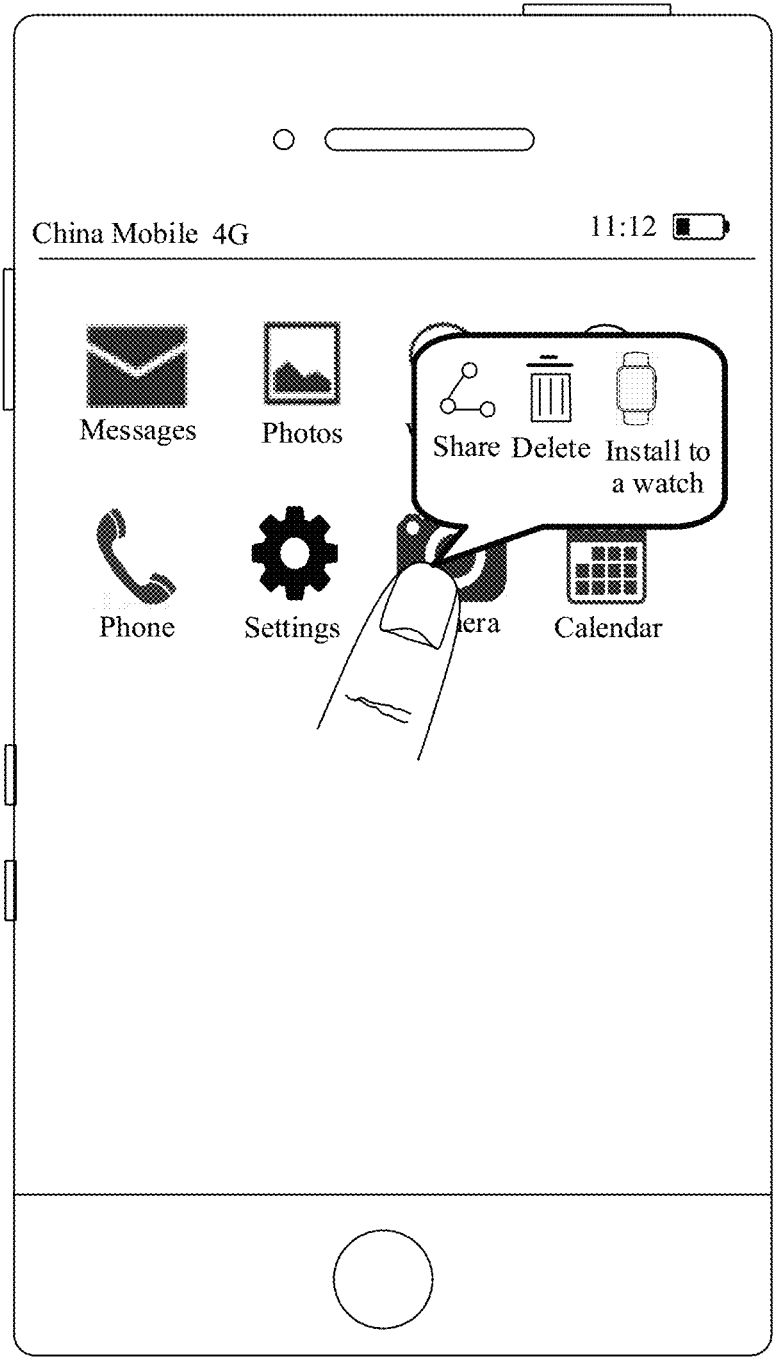
Figure 5C:
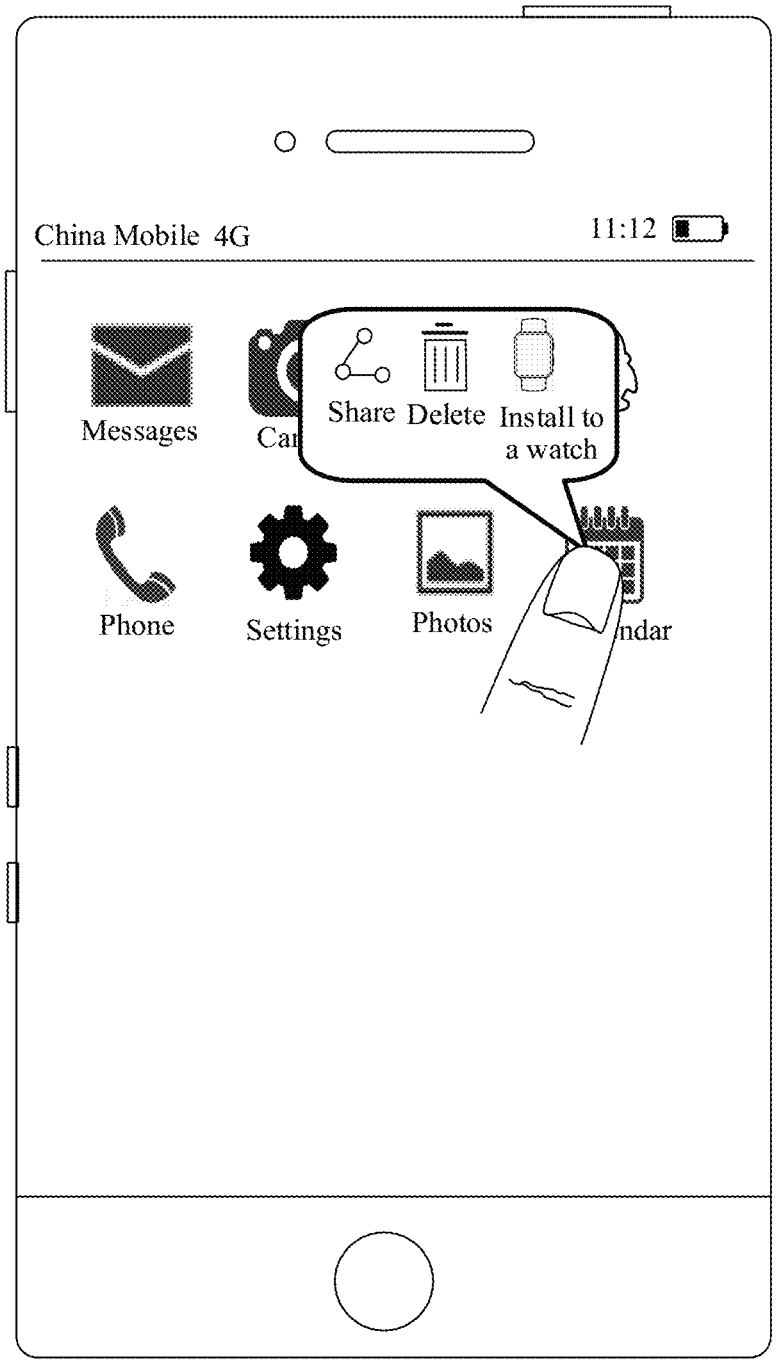

As shown in the user interface 101 in FIG. 3B, the first window may be displayed in a pop-up window manner. It should be understood that the interface 101 is merely an example. A location at which the mobile phone displays the first window may be any location within a preset range of the target application icon. In addition, the location at which the mobile phone displays the first window may change adaptively with a location at which the target application icon is located. Refer to FIG. 5A, FIG. 5B, and FIG. 5C. The location at which the mobile phone displays the first window may be dynamically adjusted with the location at which the target application icon is located.

Specifically, a correspondence between the first identifier and the wearable device may be that the first identifier is in a one-to-one correspondence with the wearable device. To be specific, each first identifier in the first window is used to identify one wearable device, or it may be understood that the first identifier is an identifier of the wearable device.

In an example, the first identifier may be an icon corresponding to the wearable device. For example, if the wearable device is a smartwatch, a corresponding first identifier may be a watch icon. For another example, if the wearable device is a smart band, a corresponding first identifier may be a band icon. For another example, if the wearable device is smart glasses, a corresponding first identifier may be a glasses icon. In an embodiment, the correspondence between the first identifier and the wearable device may alternatively be that the first identifier corresponds to a plurality of wearable devices. Alternatively, the first identifier may be a same preset icon corresponding to wearable devices of different types. For example, a plurality of smartwatches correspond to a same preset icon, and a plurality of smart bands correspond to a same preset icon. For another example, whether the wearable device is a smartwatch, smart glasses, or a smart band, the first identifier is a preset icon.

In another example, the first identifier may alternatively be a text. For example, the first identifier is a text such as "install to a watch" or "installed to glasses". In an embodiment, a text corresponding to the first identifier may alternatively be a device name and/or a model of the wearable device, or the like, and is used by the user to identify the wearable device.

In still another example, the first identifier may further include an icon and a text. Refer to the interface 101 in FIG. 3B, the first identifier includes a watch icon and a text "install to a watch". In an embodiment, the text included in the first identifier may further have different states, for example, a read-only state or a read/write state. If the text is in the read/write state, the user may edit a name of a corresponding wearable device by using the first identifier displayed in the first window. The interface 101 is merely an example. A location relationship between the icon and the text included in the first identifier is not limited in this embodiment of this disclosure.

In conclusion, the first identifier may be an icon and/or text. It should be understood that the first window may further include another function icon, for example, an icon with a sharing function or an icon with a deletion function.

In an embodiment, a wearable device corresponding to the first identifier displayed in the first window may have a binding relationship (e.g., connected or paired) with the mobile phone. For example, the binding relationship may mean that the wearable device corresponding to the first identifier may be a device currently connected to the mobile phone, or the wearable device corresponding to the first identifier is a device previously connected to the mobile phone, for example, a device successfully paired with and connected to the first terminal device. Alternatively, the first identifier is preset. For example, a manner of presetting the first identifier may be defined in a protocol or a standard, may be set by a developer, or may be configured by a user. This is not limited in this embodiment of this disclosure.

Figure 6:
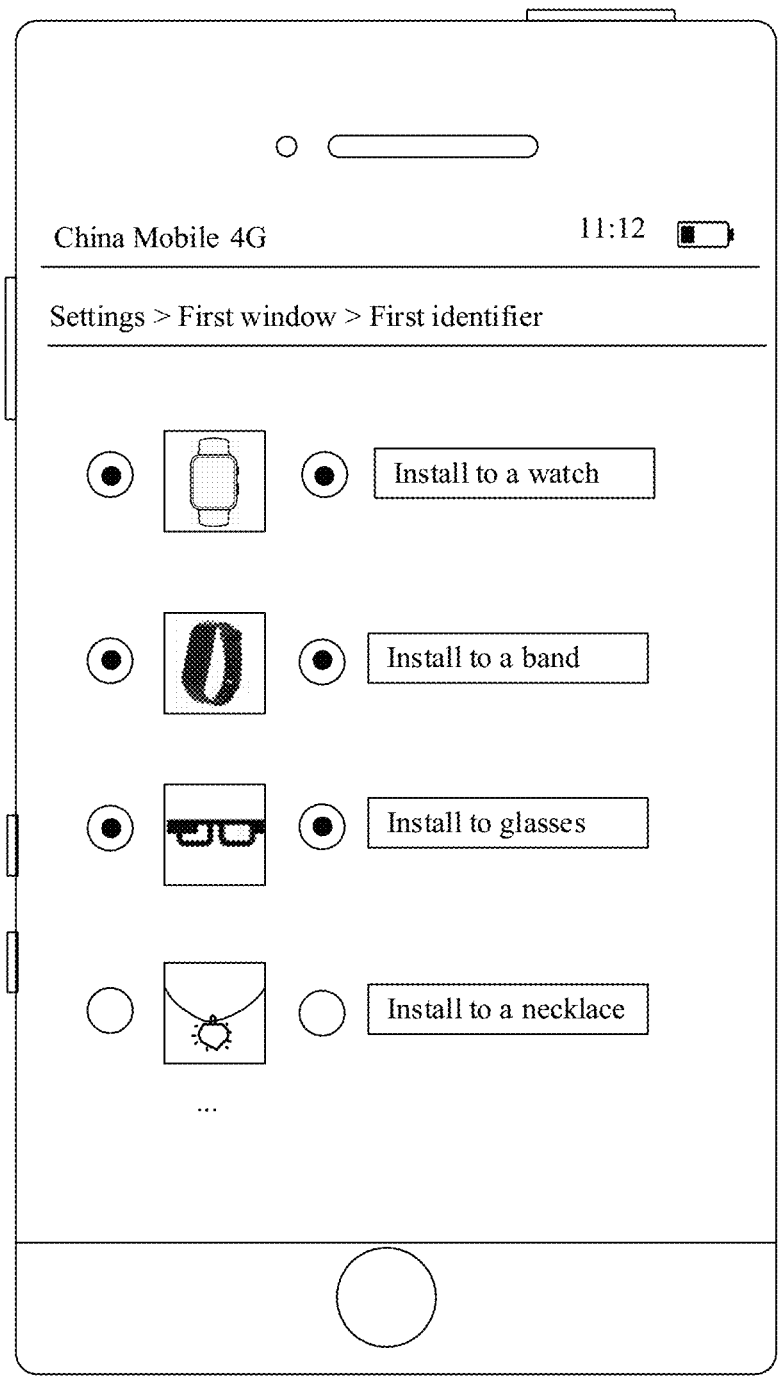
FIG. 6 is a schematic diagram of a configuration interface of a first window according to an embodiment of this disclosure.

FIG. 6 is a schematic diagram of an interface for configuring a first identifier according to an embodiment of this disclosure. Each first identifier may correspond to one type of wearable device. A user may select, in a configuration interface shown in FIG. 6, a first identifier that needs to be displayed in a first window. For example, if the user has only a smartwatch, the user may select a watch icon and an "install to a watch" text in the configuration interface shown in FIG. 6. For another example, if the user has a smartwatch, a smart band, and smart glasses, the user may separately select a watch icon, a band icon, and a glasses icon in the configuration interface shown in FIG. 6. If the first identifier is not configured, the first identifier is not displayed in the first window.

It should be noted that the configuration interface shown in FIG. 6 is merely an example. A manner of configuring the first window and a form of the first window are not limited in this embodiment of this disclosure. For example, when the first window is configured, a name or a model of a wearable device corresponding to the first identifier may be further selected to be displayed, or the first window may further include another function button or the like. This is not limited in this embodiment of this disclosure. It should be understood that the first identifier displayed in the first window may include first identifiers corresponding to wearable devices corresponding to some or all of the foregoing binding relationships. For example, the first identifier displayed in the first window may include a preset first identifier and a first identifier corresponding to a wearable device currently connected to the mobile phone. This is not limited in this embodiment of this disclosure.

Refer to the interface 102 in FIG. 3C. When the mobile phone receives a selection (for example, tap) operation performed by the user on a target first identifier in the first window shown in the interface 102, or when the mobile phone detects that the target first identifier is selected in the first window, the mobile phone sends first indication information to a target wearable device corresponding to the target first identifier, where the first indication information indicates the target wearable device to install the target application corresponding to the target application icon.

The target first identifier is a first identifier selected by the user in the first window. The target wearable device is a wearable device corresponding to the target first identifier. For example, in the scenario shown in FIG. 3A, as shown in the interface 100, the target application is WeChat. As shown in the interface 102 in FIG. 3C, the target first identifier is an identifier including a watch icon. It is assumed that the wearable device corresponding to the target first identifier is a smartwatch, the mobile phone detects that the watch icon is selected in the first window shown in the interface 102, and sends the first indication information to the smartwatch corresponding to the watch icon. The first indication information indicates the smartwatch to install the WeChat application.

According to the foregoing method, the user may select one or more target application programs on the first terminal device to be installed on the second terminal device. A dedicated application program specifically for managing the second terminal device does not need to be installed on the first terminal device, and all application programs of the first terminal device do not need to be installed on the second terminal device at a time. In the method, the user can flexibly select one or more to-be-installed target application programs, and a manner of controlling installation of an application program on the second terminal device is more convenient. Therefore, the application program on the second terminal device can be flexibly managed.

In an embodiment of this disclosure, the first window may be displayed by using a first-level menu (referring to the foregoing embodiment). The first window may be displayed by using an N-level menu. For example, when there are a plurality of wearable devices, first identifiers respectively corresponding to the plurality of wearable devices may be displayed by using a multi-level menu. The first window may be a second-level menu or a third-level menu. This is not limited in this embodiment of this disclosure. The following uses the second-level menu as an example to describe a manner of displaying the first window.

FIG. 7A, FIG. 7B, FIG. 7C, FIG. 7D, and FIG. 7E are other schematic flowcharts of controlling installation of an application program of a terminal device according to an embodiment of this disclosure. FIG. 7A, FIG. 7B, FIG. 7C, FIG. 7D, and FIG. 7E include an interface 200, an interface 201, an interface 202, an interface 203, and an interface 204.

A second window displayed in the interface 201 is the first-level menu, and a first window displayed in the interface 203 on the basis of the second window is the second-level menu. For ease of description, the first-level menu is used to replace the second window, and the second-level menu is used to replace the first window in the following.

Figure 7A:
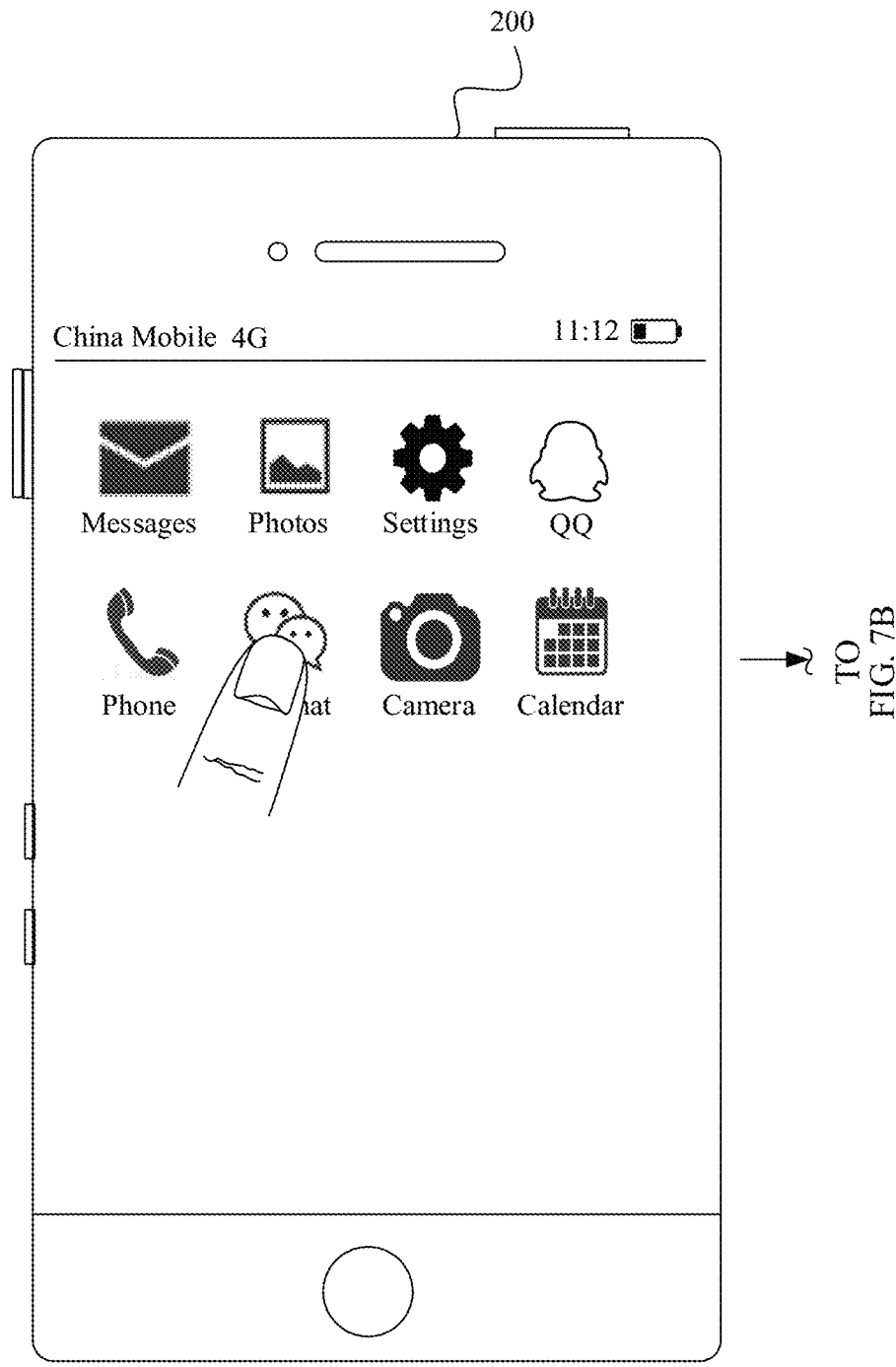
FIG. 7A, FIG. 7B, FIG. 7C, FIG. 7D, and FIG. 7E are schematic diagrams of another group of interfaces according to an embodiment of this disclosure.
Figure 7B:
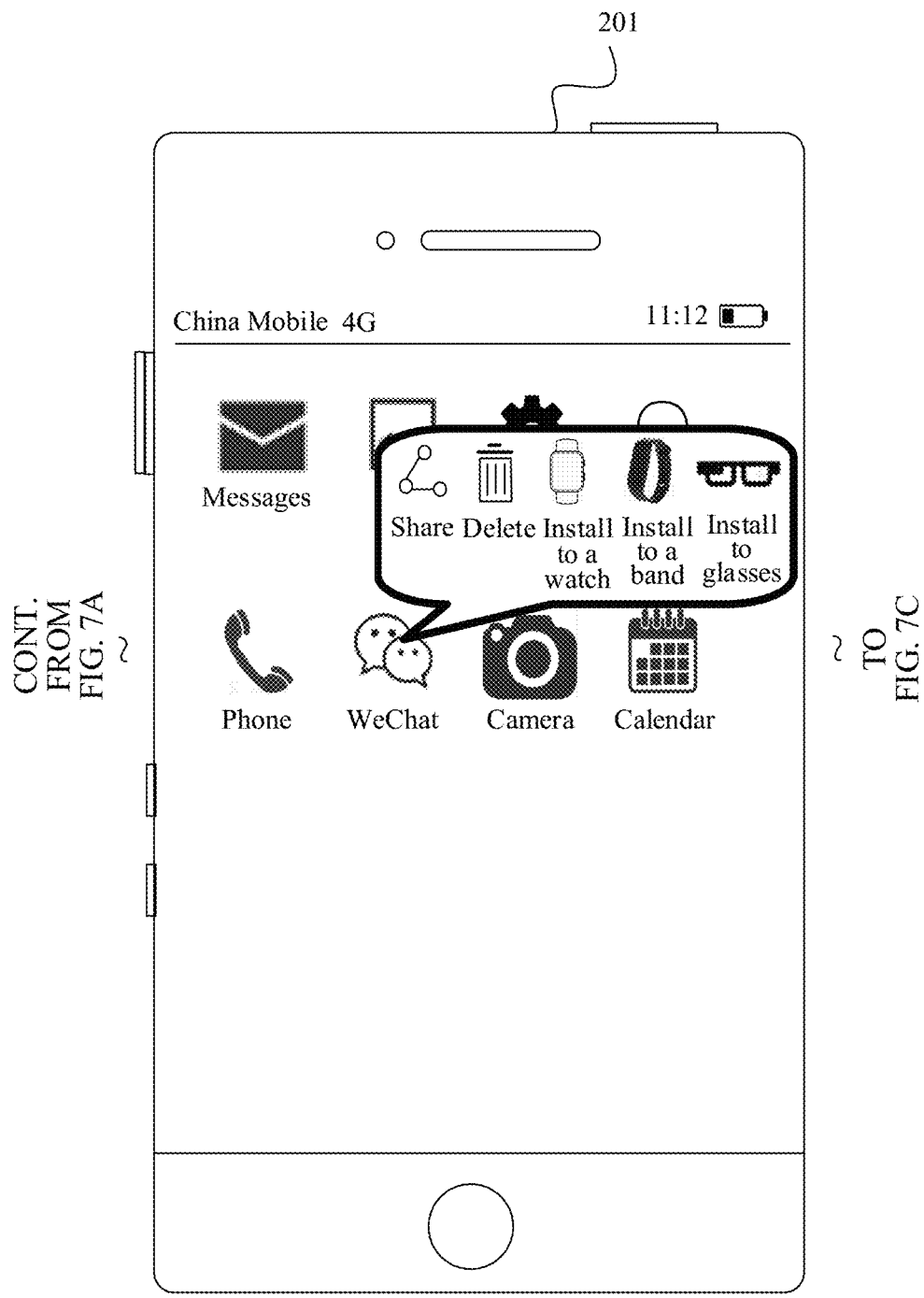
Figure 7C:
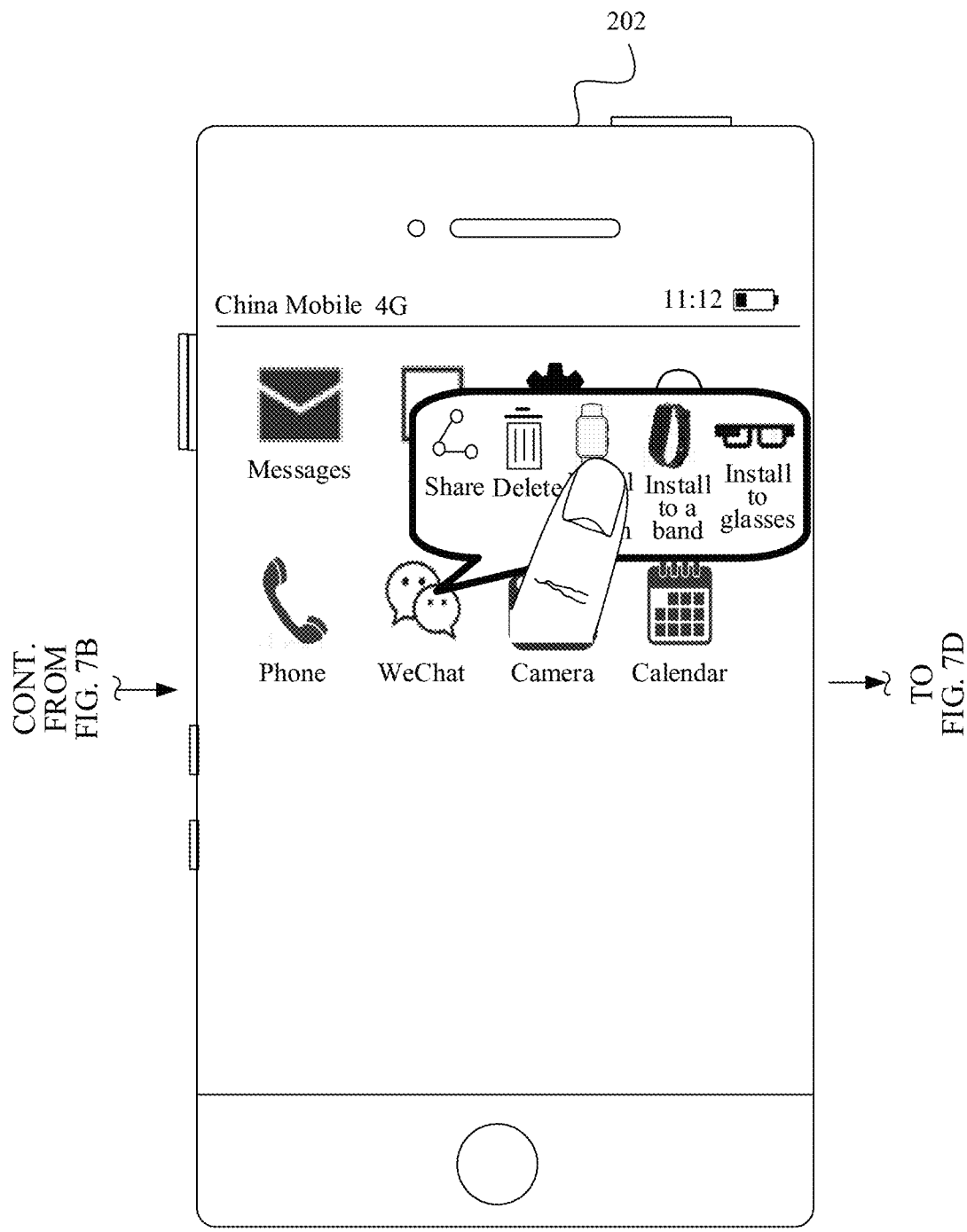
Figure 7D:
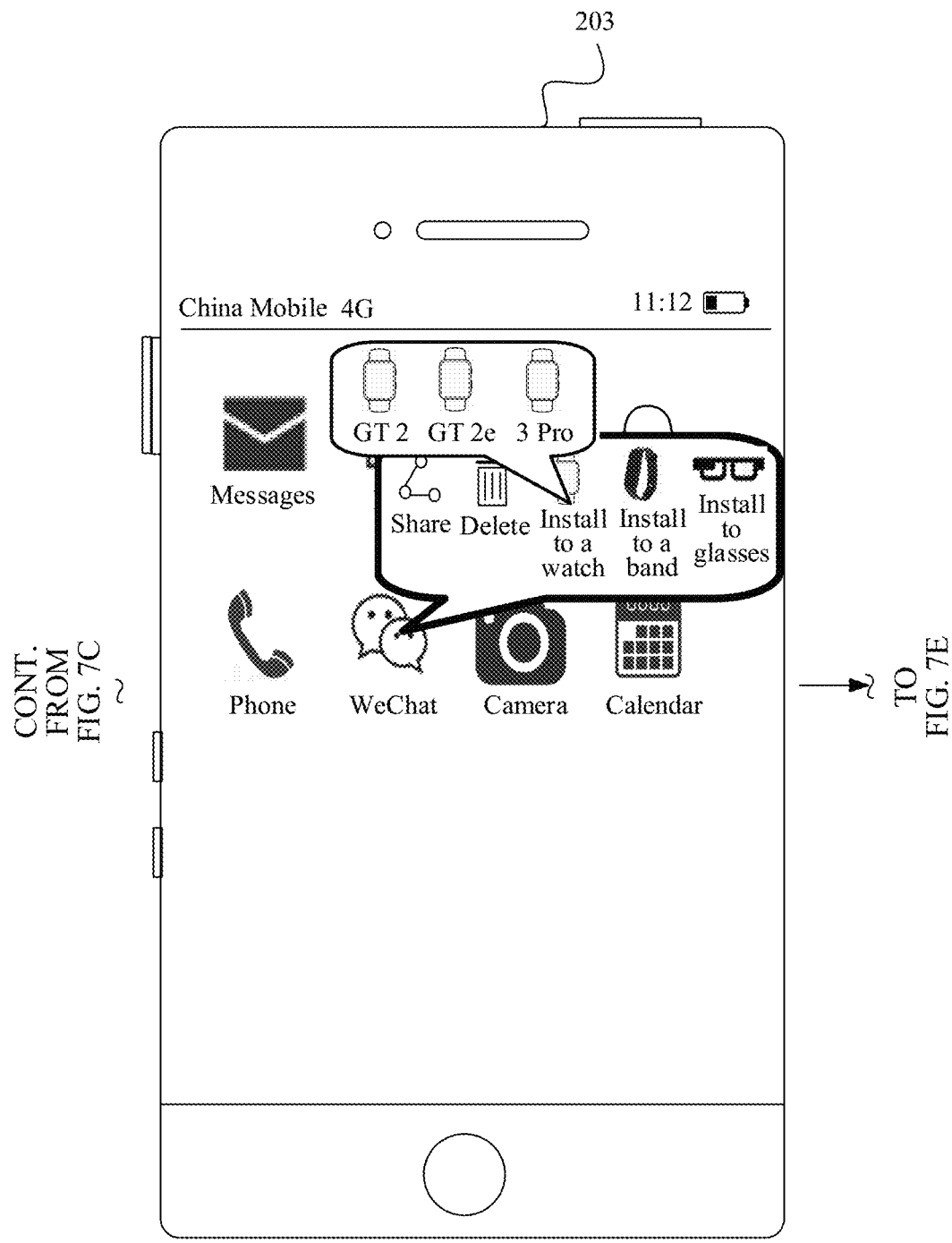
Figure 7E:
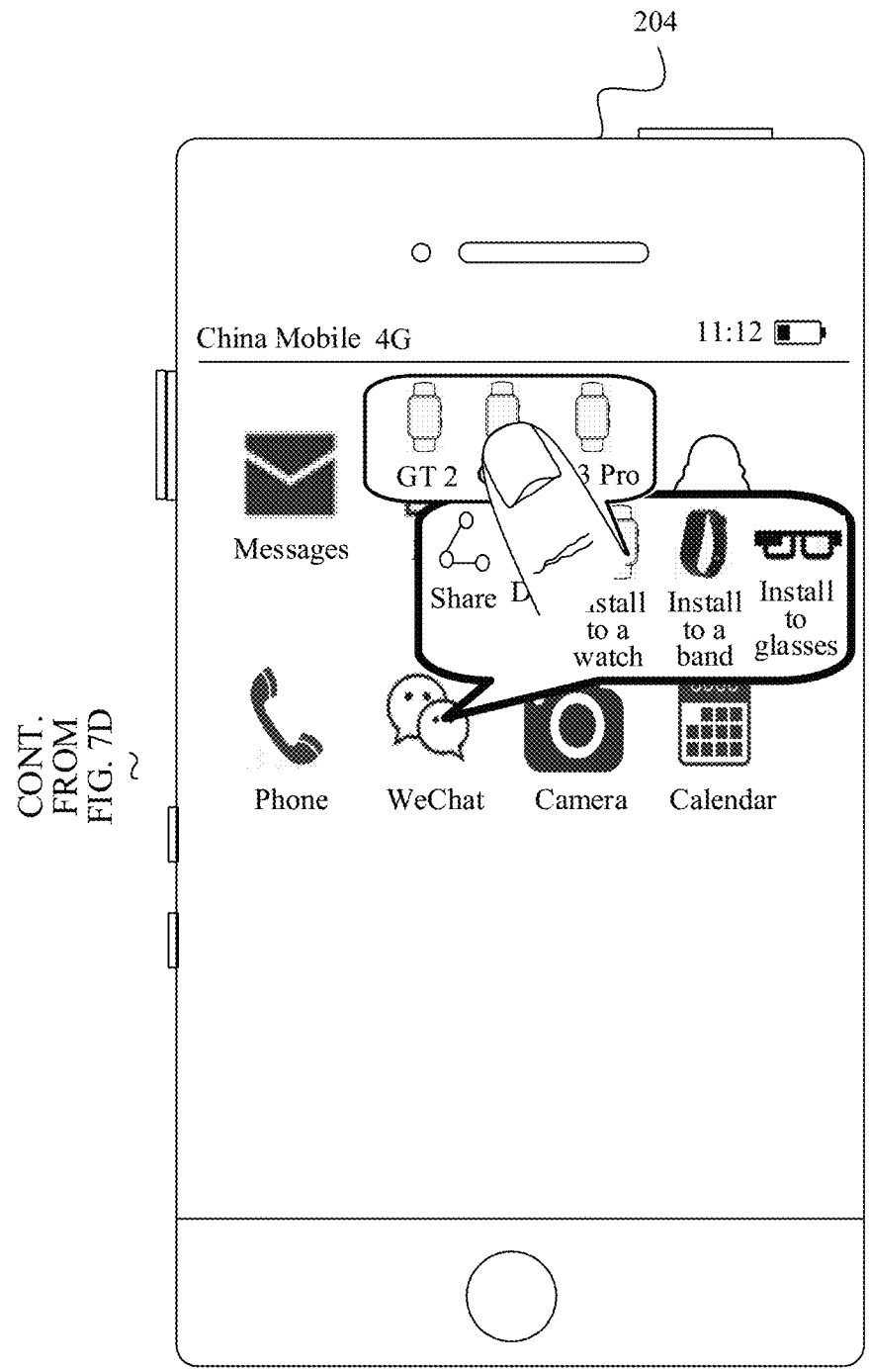

As shown in FIG. 7A, the mobile phone receives a first operation performed by a user on a target application icon shown in the interface 200 in FIG. 7A. In response to the first operation, the mobile phone jumps to the interface 201, that is, the mobile phone displays the first-level menu. The first-level menu includes at least one second identifier, and the second identifier may be used to trigger an indication for displaying the second-level menu. For example, the second identifier may include an icon and/or a text of the first identifier.

Referring to the interface 203, when the mobile phone detects that the second identifier in the interface 202 is selected, that is, when the mobile phone detects that the user performs a selection operation on a target second identifier in the interface 202, the mobile phone displays the second-level menu. The second-level menu includes at least one first identifier, and the first identifier is in a one-to-one correspondence with a wearable device. Referring to the interface 204, when the mobile phone receives a selection (for example, tap) operation performed by the user on a target first identifier in the second-level menu shown in the interface 204, that is, when the mobile phone detects that the target first identifier is selected in the first window, the mobile phone sends first indication information to a target wearable device corresponding to the target first identifier. The first indication information indicates the target wearable device to install a target application corresponding to the target application icon.

It should be understood that, for a manner of displaying the second identifier in the second window, refer to the foregoing manner of displaying the first identifier in the first window. In other words, in an embodiment of this disclosure, the second window may also be configured. Alternatively, the first identifier may correspond to a plurality of wearable devices. When the first identifier corresponds to the plurality of wearable devices, the mobile phone may display a second-level menu of the first identifier when the mobile phone responds to a selection operation performed by the user on the first identifier, and the second-level menu displays the plurality of wearable devices corresponding to the first identifier. It should be noted that the foregoing is merely an example, and manners of displaying the first window and the second window are not limited in this embodiment of this disclosure.

It should be noted that the foregoing manner of displaying the first window in a form of a multi-level menu may be preset, where the second identifier included in the first-level menu may represent one type of wearable devices, and the first identifier included in the second-level menu represents a device that is of this type of wearable devices and that has a binding relationship (e.g., connected or paired) with a first terminal device. Alternatively, the mobile phone may further dynamically adjust, based on a detected quantity of wearable devices connected to the mobile phone, a manner of displaying the first window. For example, if it is detected that a quantity of wearable devices connected to the mobile phone reaches a specified quantity, the first window may be displayed in a form of the multi-level menu (for example, the second-level menu). Refer to specific descriptions of FIG. 7A, FIG. 7B, FIG. 7C, FIG. 7D and FIG. 7E. Details are not described herein again.

In the foregoing two embodiments, an operation of selecting the first identifier by the user may be tapping the first identifier. There are also a plurality of manners of closing the first window. In an embodiment, after the mobile phone detects that the user selects one first identifier in the first window, the first window is closed, that is, after the mobile phone displays the first window, the user can select only one first identifier. Alternatively, the first window may have time validity. In this scenario, the mobile phone always displays the first window within a validity time of the first window, to ensure that the user selects one or more first identifiers in the first window. For the selected one or more first identifiers, the mobile phone separately sends the first indication information to wearable devices corresponding to the selected first identifiers.

In another embodiment, the first window may have time validity. Specifically, the first window is not closed within a validity time of the first window. To be specific, when the first window is displayed for the first time, the first window is triggered through the first operation. The mobile phone always displays the first window within the validity time of the first window, and the user does not need to repeatedly trigger the first operation to display the first window. The user may select the first identifier for a plurality of times in the first window, to install a same target application on wearable devices corresponding to different first identifiers.

Figure 8A:
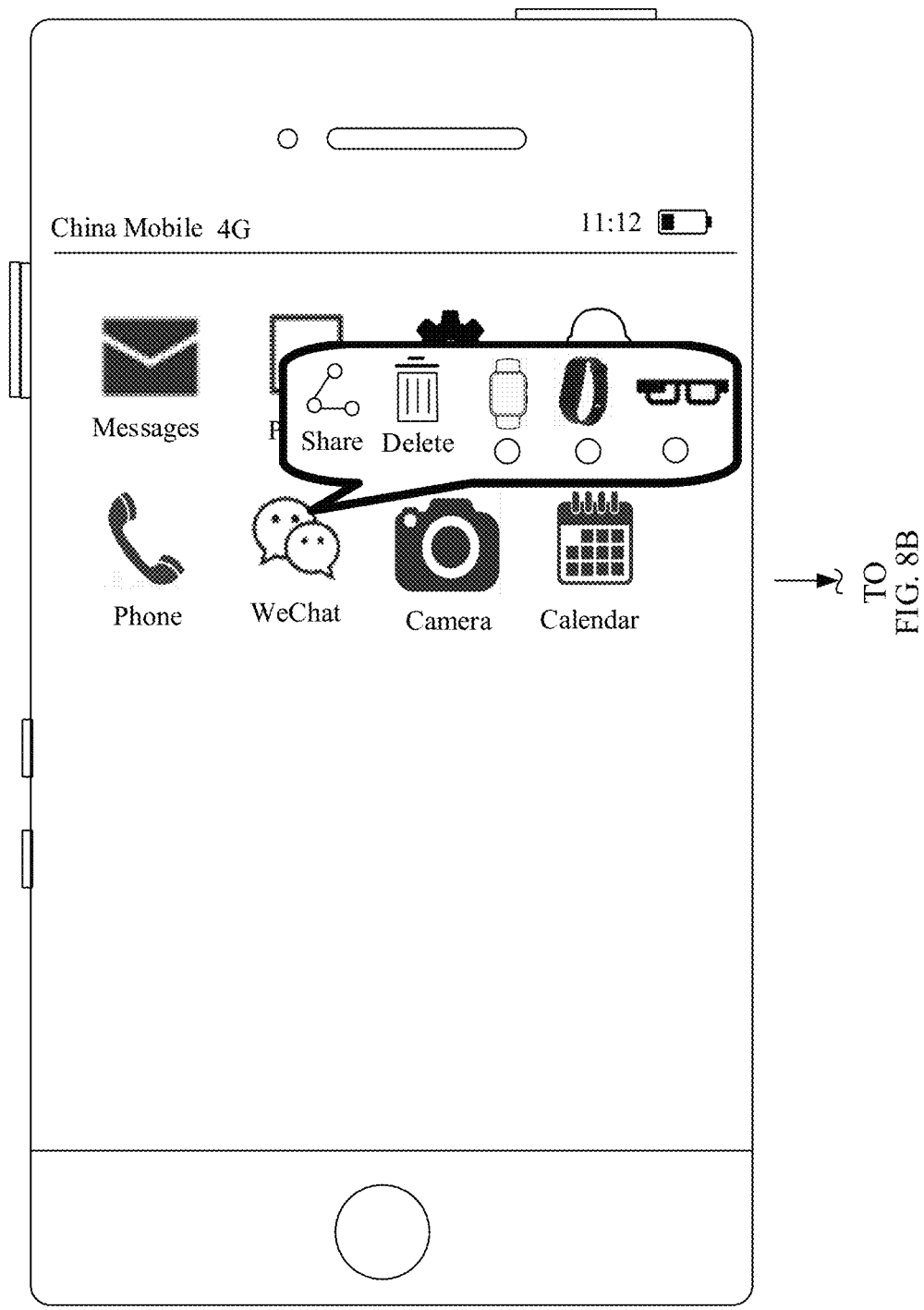
FIG. 8A, FIG. 8B, and FIG. 8C are schematic diagrams of another group of interfaces according to an embodiment of this disclosure.
Figure 8B:
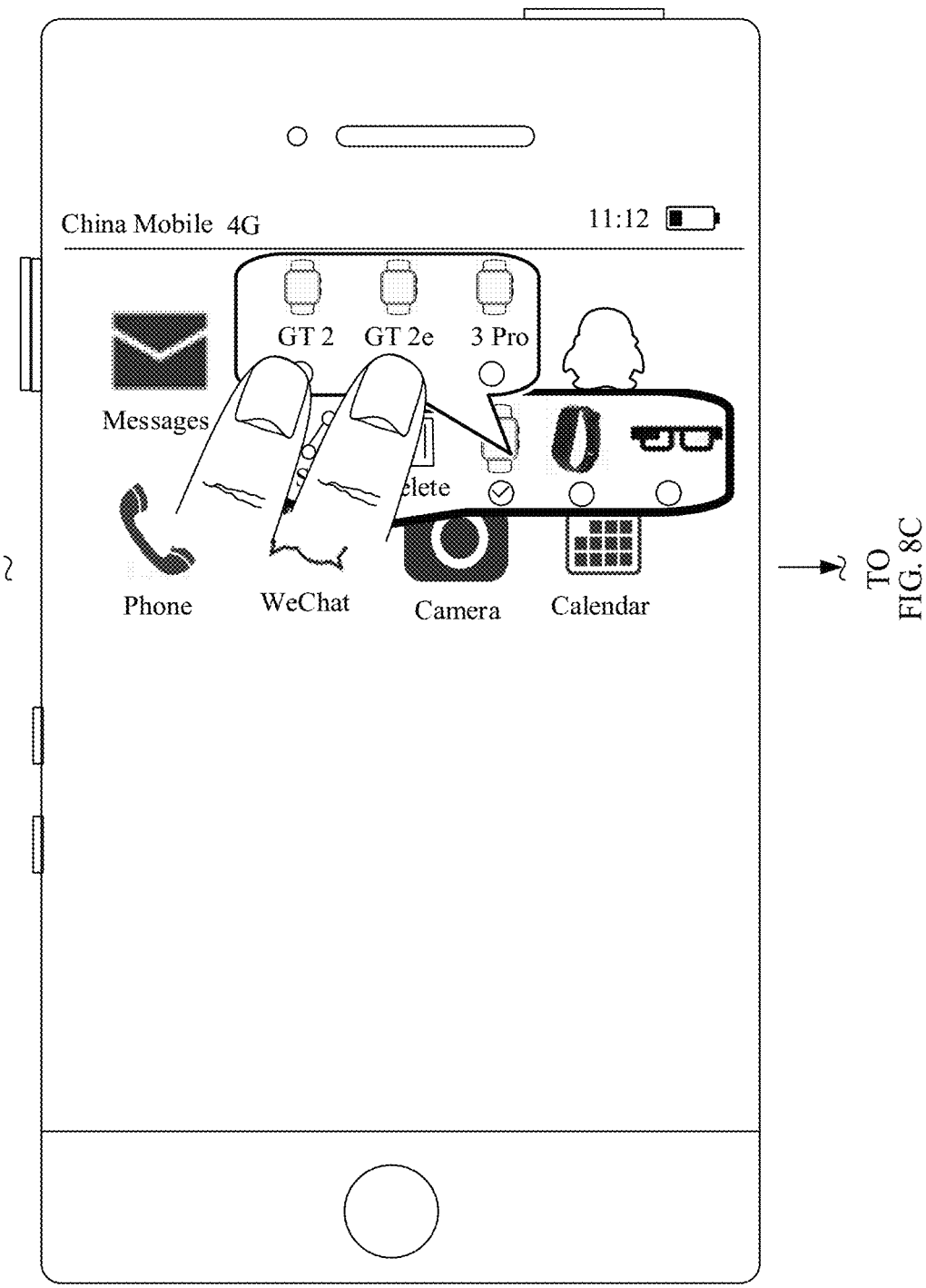
Figure 8C:
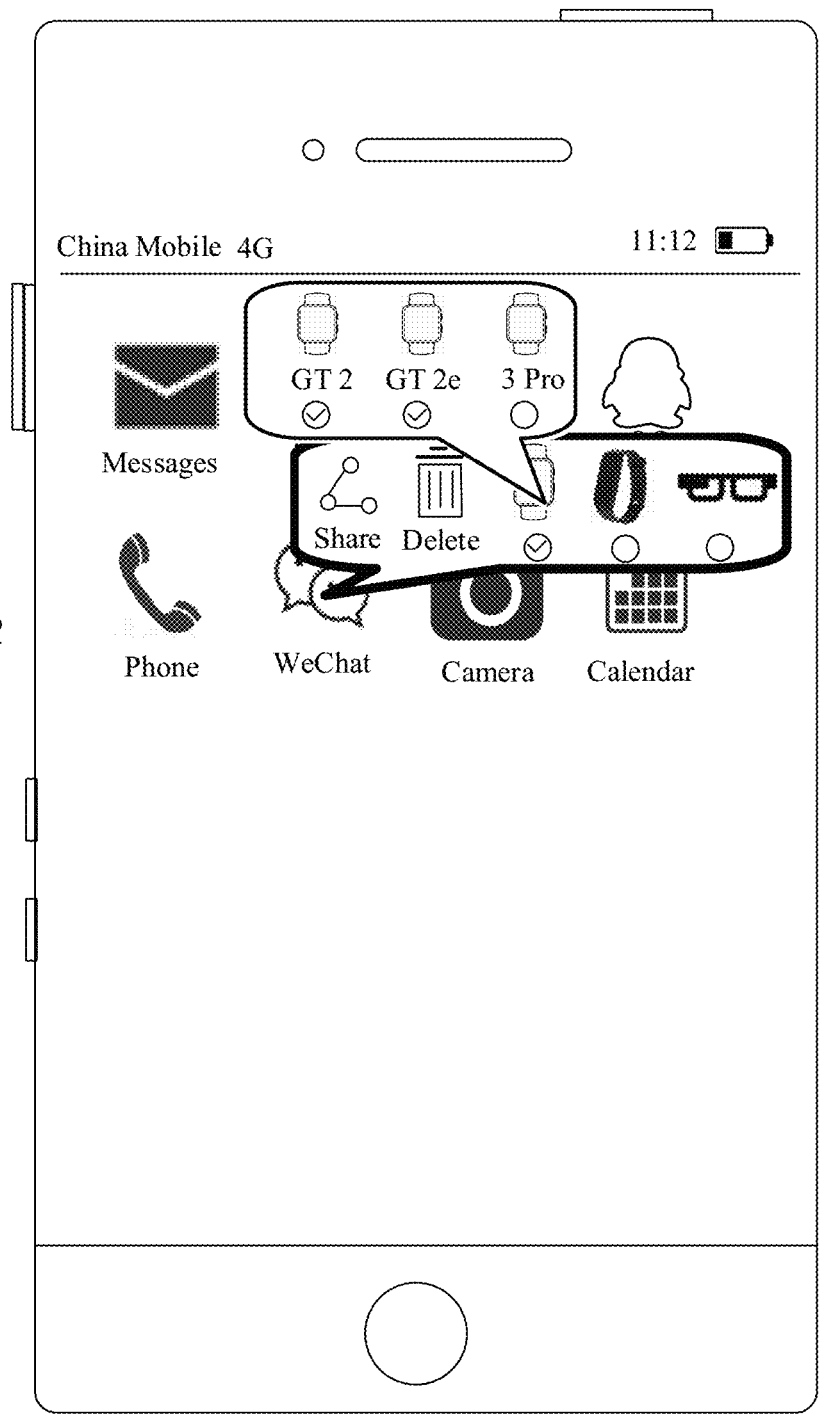
Figure 9A:
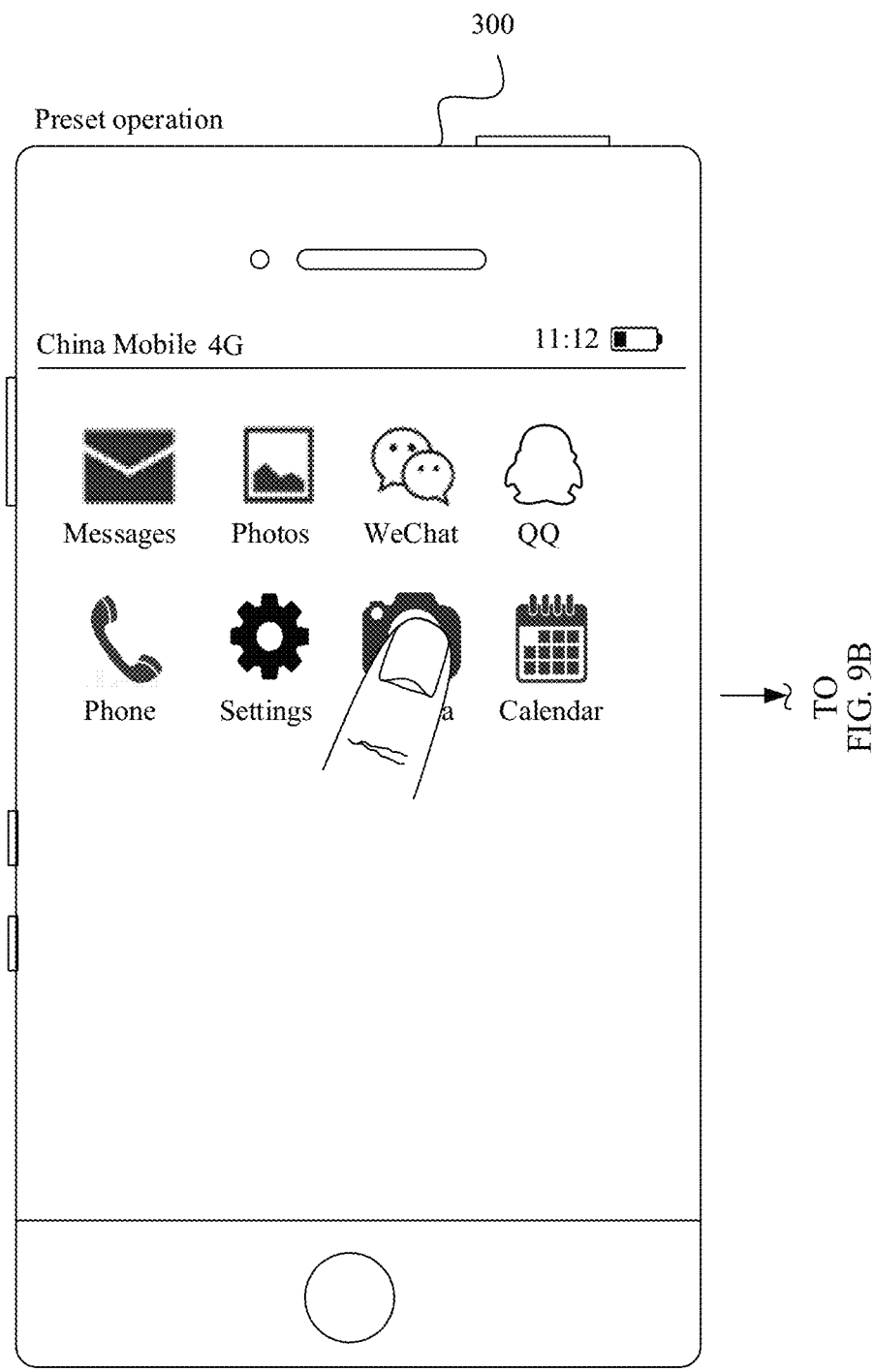
FIG. 9A, FIG. 9B, FIG. 9C, FIG. 9D, and FIG. 9E are schematic diagrams of another group of interfaces according to an embodiment of this disclosure.
Figure 9B:
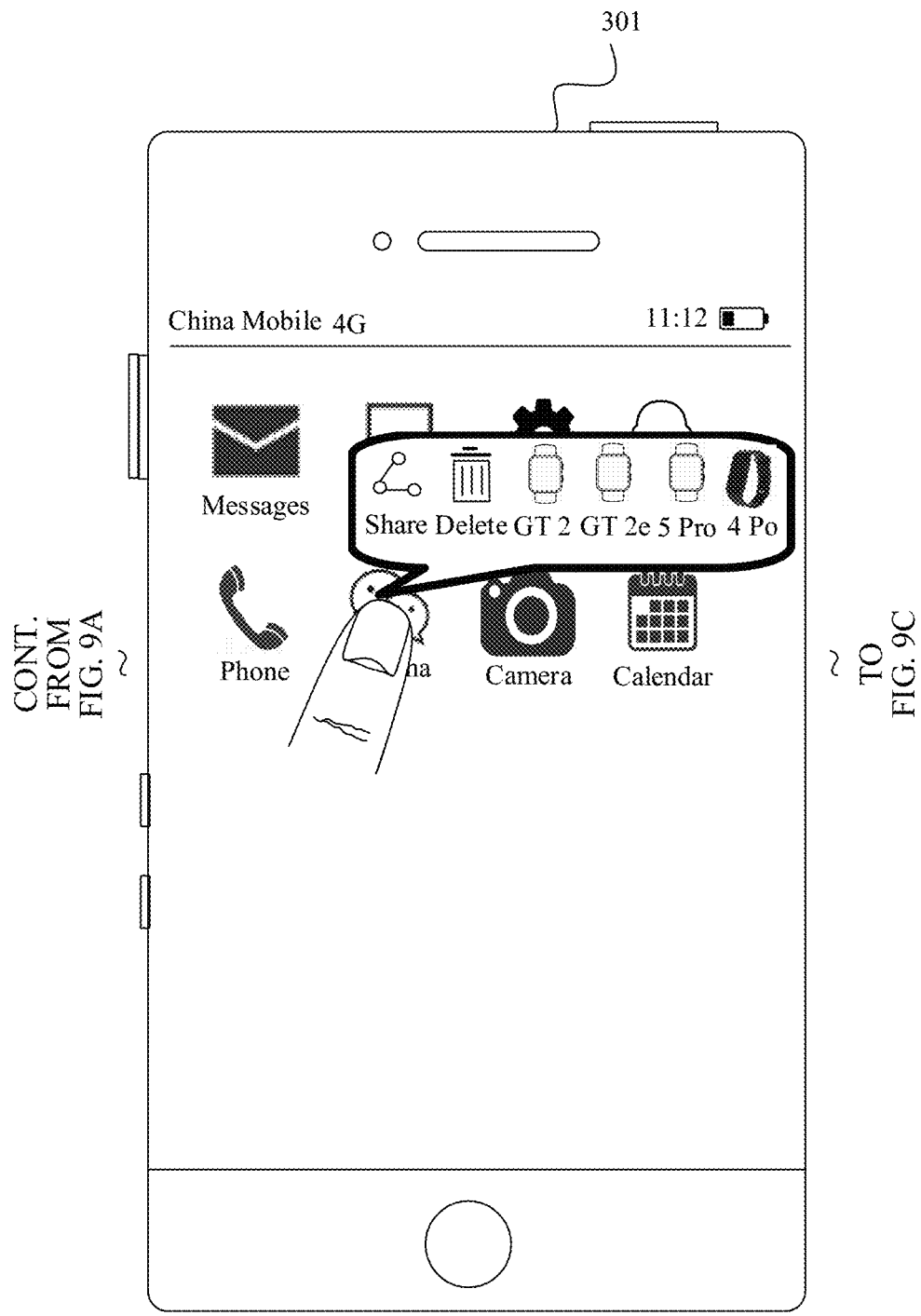
Figure 9C:
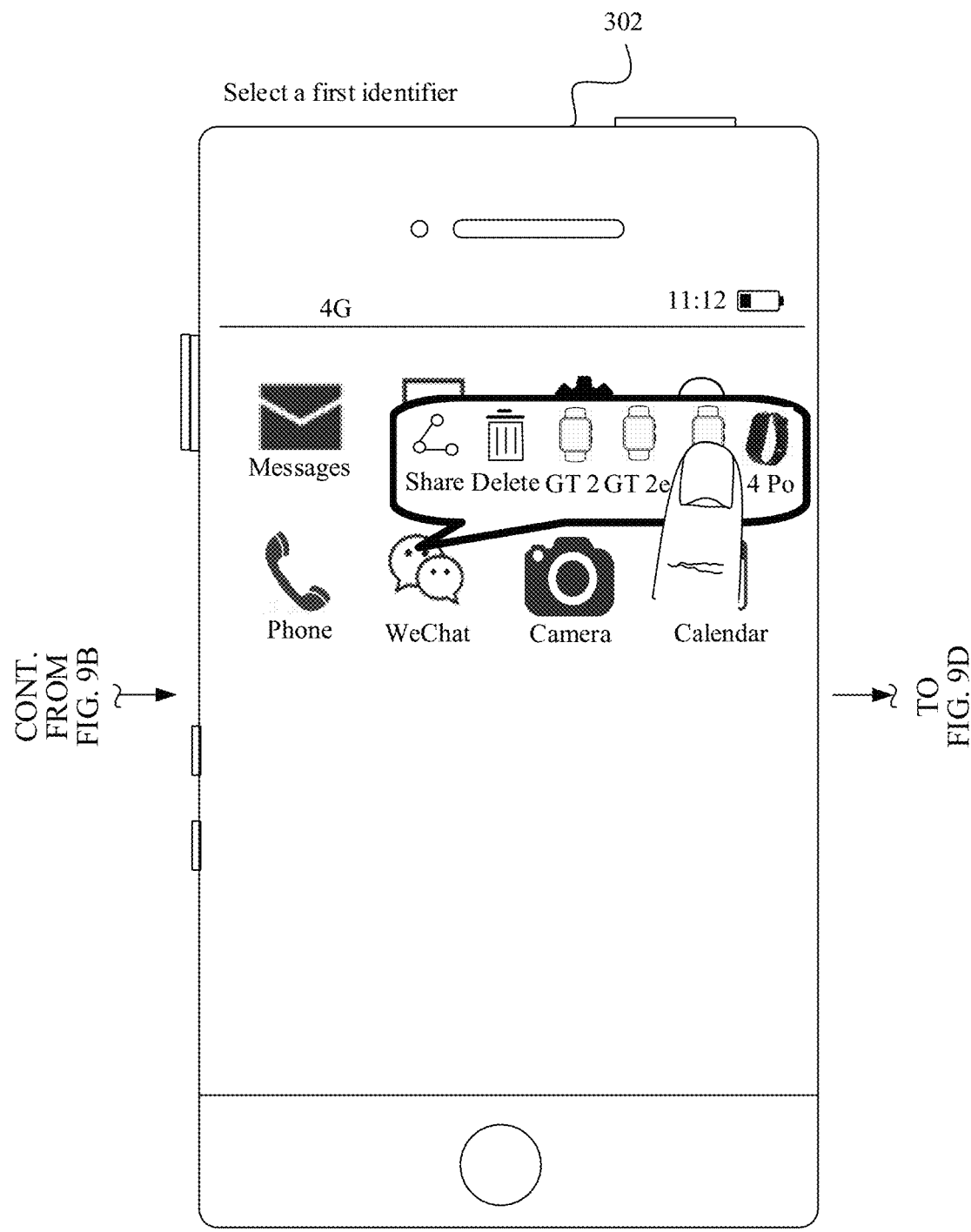
Figure 9D:
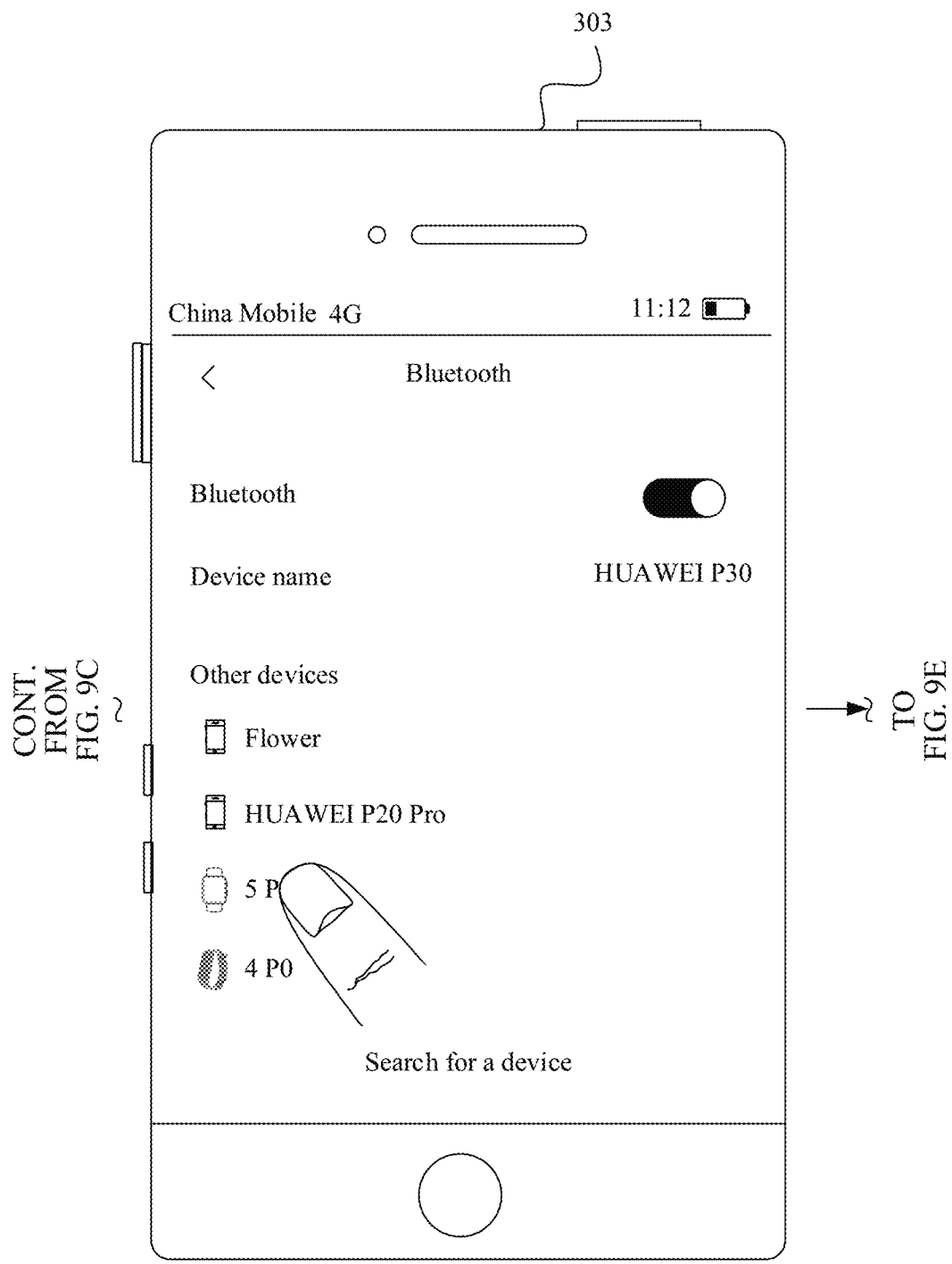
Figure 9E:
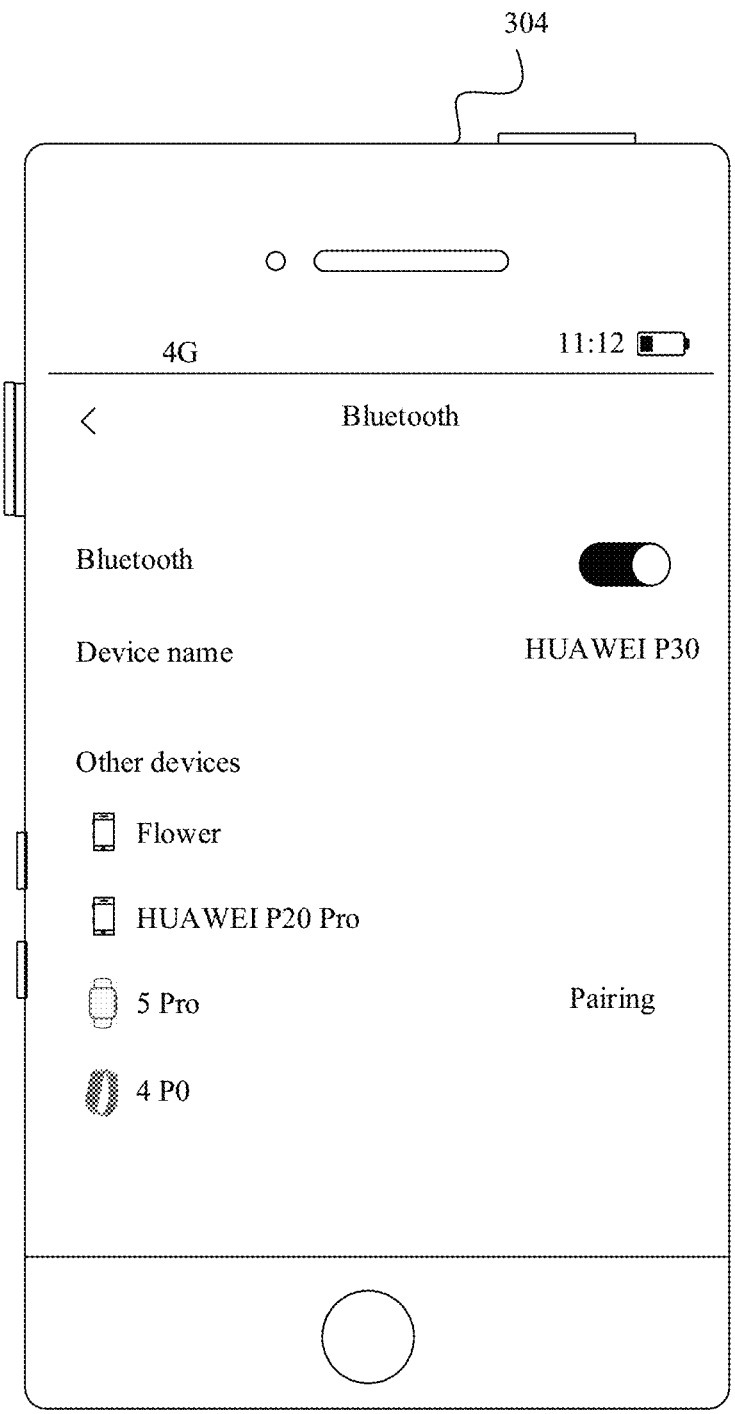

In another embodiment, an operation of selecting the first identifier by the user may be ticking the first identifier. As shown in FIG. 8A, FIG. 8B, and FIG. 8C, the second identifier of the second window and the first identifier in the first window may further have an operation box for ticking.

The user may tick one or more first identifiers for selection. Optionally, a selected first identifier may be switched to another display state, to notify user that the first identifier is selected. In an embodiment, when the selected first identifier is tapped again, the first identifier may be further released, that is, the first identifier is not selected. For example, the first window may further include a confirmation key (not shown in FIG. 8A, FIG. 8B and FIG. 8C). After the user selects one or more first identifiers, the user may tap the confirmation key to select the first identifier. In an embodiment, after the user taps the confirmation key, the mobile phone no longer displays the first window. The foregoing manner can ensure that the user selects one or more first identifiers in the first window.

The foregoing describes a manner of displaying the first window and the first identifier included in the first window. Specifically, the first identifier may further have different display states. In different application scenarios, the first identifier may be in different display states. For example, the first identifier has only one display state (denoted as a first display manner). For example, the display state is an enabling state, that is, whether a wearable device corresponding to the first identifier is connected to the mobile phone or not, the first identifier is in the enabling state. For another example, the first identifier has two display states (denoted as a second display manner). For example, the two display states include a disabling state and an enabling state. For example, when a wearable device corresponding to the first identifier is not connected to the mobile phone, the first identifier may be in the disabling state, and when a wearable device corresponding to the first identifier is connected to the mobile phone, the first identifier is in the enabling state.

First, the first display manner is described in detail.

In the first display manner, the first identifier in the first window has only one display state.

FIG. 9A, FIG. 9B, FIG. 9C, FIG. 9D, and FIG. 9E are other schematic flowcharts of controlling installation of an application program of a terminal device according to an embodiment of this disclosure. FIG. 9A, FIG. 9B, FIG. 9C, FIG. 9D, and FIG. 9E include an interface 300, an interface 301, an interface 302, an interface 303, and an interface 304.

Operation 1: A mobile phone receives a first operation triggered by a user on a target application icon on the interface 300.

Operation 2: Display a first window (referring to the interface 301) in response to the first operation.

For example, the first identifier may be selected in an enabling state, and the first identifier cannot be selected in a disabling state. It is assumed that a wearable device corresponding to the first identifier included in the first window is a device previously connected to the mobile phone. For example, all the first identifiers displayed in the first window are in the enabling state, that is, all the first identifiers can be selected by the user.

Operation 3: The mobile phone detects a selection operation performed by the user on a target first identifier in the first window shown in the interface 302.

It may be understood that, if the first identifier has only one display state, the user cannot intuitively determine, through the first window based on the first identifiers displayed in the first window, which wearable devices are connected to the mobile phone, that is, a wearable device corresponding to the first identifier selected by the user in the first window may be connected to the mobile phone, or may not be connected to the mobile phone.

Operation 4: In response to the selection operation, determine whether a target wearable device corresponding to the target first identifier is connected to the mobile phone.

If the target wearable device corresponding to the target first identifier is connected to the mobile phone, operation 5 is performed. Otherwise, operation 6 is performed.

Operation 5: Send first indication information to the target wearable device, where the first indication information indicates the target wearable device to install a target application.

For example, the target first identifier is in a one-to-one correspondence with the target wearable device. To be specific, in the interface 302, if the mobile phone detects that the mobile phone is connected to one target wearable device, the mobile phone sends the first indication information to the target wearable device, to indicate the target wearable device to install the WeChat application.

Operation 6: The mobile phone establishes a connection to the target wearable device, and after the mobile phone successfully establishes the connection to the target wearable device, sends the first indication information to the target wearable device, to indicate the target wearable device to install the target application.

In an embodiment, the mobile phone scans the target wearable device, and sends second indication information to the target wearable device after the mobile phone finds the target wearable device by scanning, where the second indication information indicates the target wearable device to pair with and connect to the mobile phone.

In another embodiment, refer to the interface 303. The mobile phone scans a terminal device that can perform Bluetooth pairing, and displays the scanned terminal device in the interface 303. After the mobile phone receives an operation of manually selecting a target wearable device (a smartwatch named 5 Pro shown in FIG. 9D) by the user in the interface 303, the mobile phone sends second indication information (for example, a Bluetooth pairing request) to the target wearable device in response to the operation, and then enters a pairing and connection process with the target wearable device (referring to the interface 304). It should be understood that the user may alternatively select another terminal device in the interface 303, and perform the foregoing subsequent procedure. This is not limited in this embodiment of this disclosure.

In an embodiment, in the foregoing operation 2, the mobile phone may further dynamically adjust, based on a quantity of detected wearable devices previously connected to the mobile phone, a manner of displaying the first window. For example, a first-level menu displays a preset identifier (the second identifier) corresponding to the wearable device previously connected to the mobile phone, and a second-level menu displays the detected wearable device previously connected to the mobile phone. Refer to specific descriptions of FIG. 7A, FIG. 7B, FIG. 7C, FIG. 7D, and FIG. 7E or FIG. 8A, FIG. 8B, and FIG. 8C. Details are not described herein again.

In the second display manner, the first identifier in the first window has two display states.

For example, the first identifier in the first window has at least two display states, and different display states represent connection relationships between the wearable device corresponding to the first identifier and the first terminal device.

In other words, the first identifier displayed in the first window is a wearable device previously connected to the mobile phone. Before the first terminal device displays the first window, the first terminal device determines whether the wearable device previously connected to the mobile phone is currently connected to the mobile phone. If the wearable device is connected to the mobile phone, the first identifier in the first window is in an enabling state. If the wearable device is not connected to the mobile phone, the first window may still include the first identifier corresponding to the wearable device, but the first identifier is in a disabling state.

Different display states may have different colors, forms, and the like. For example, in the enabling state, the first identifier is colored, and in the disabling state, the first identifier is gray. Alternatively, the first identifier may be selected in the enabling state, and the first identifier cannot be selected in the disabling state.

Figures 1, 10A:
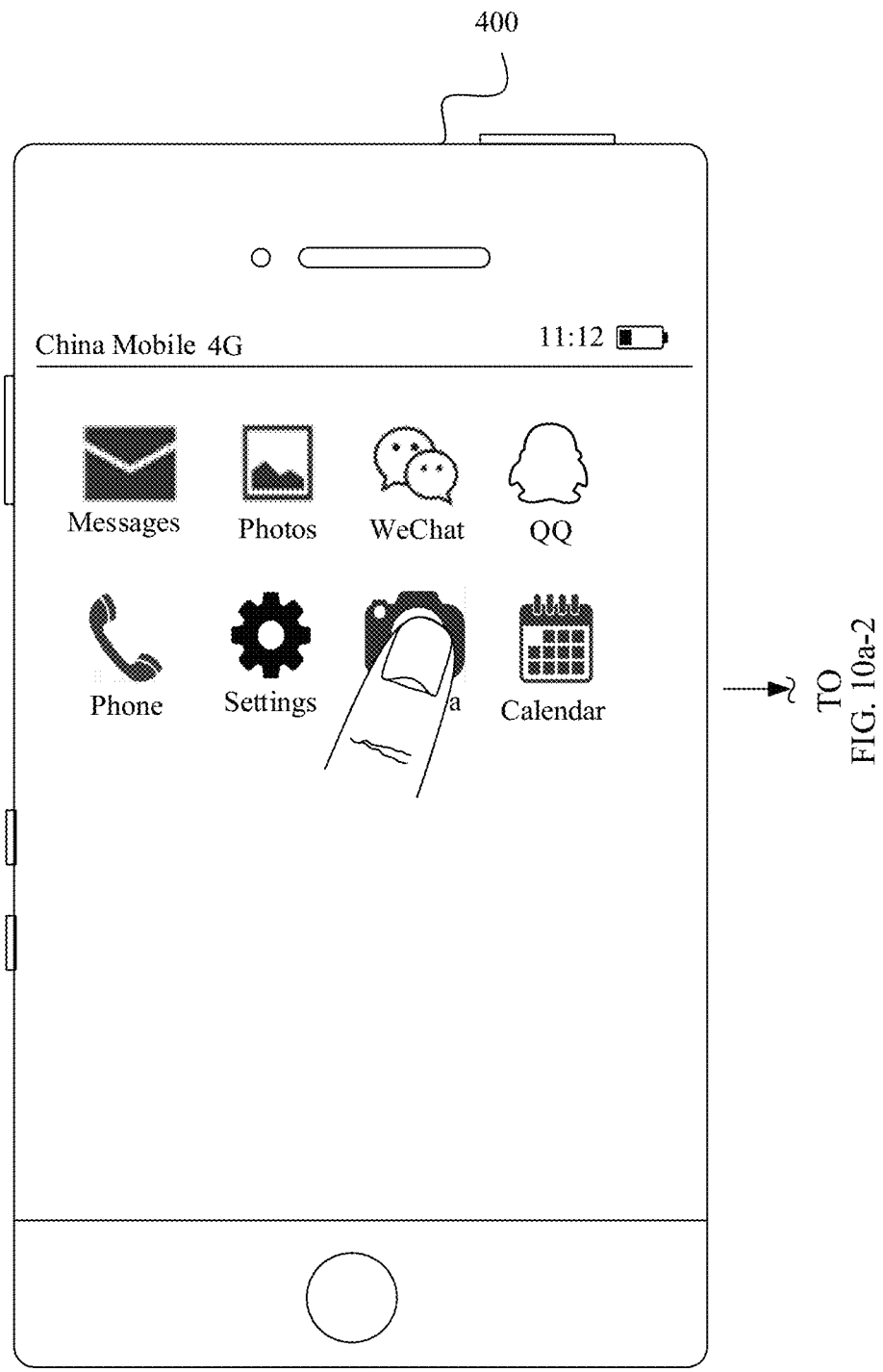
Figures 2, 10A:
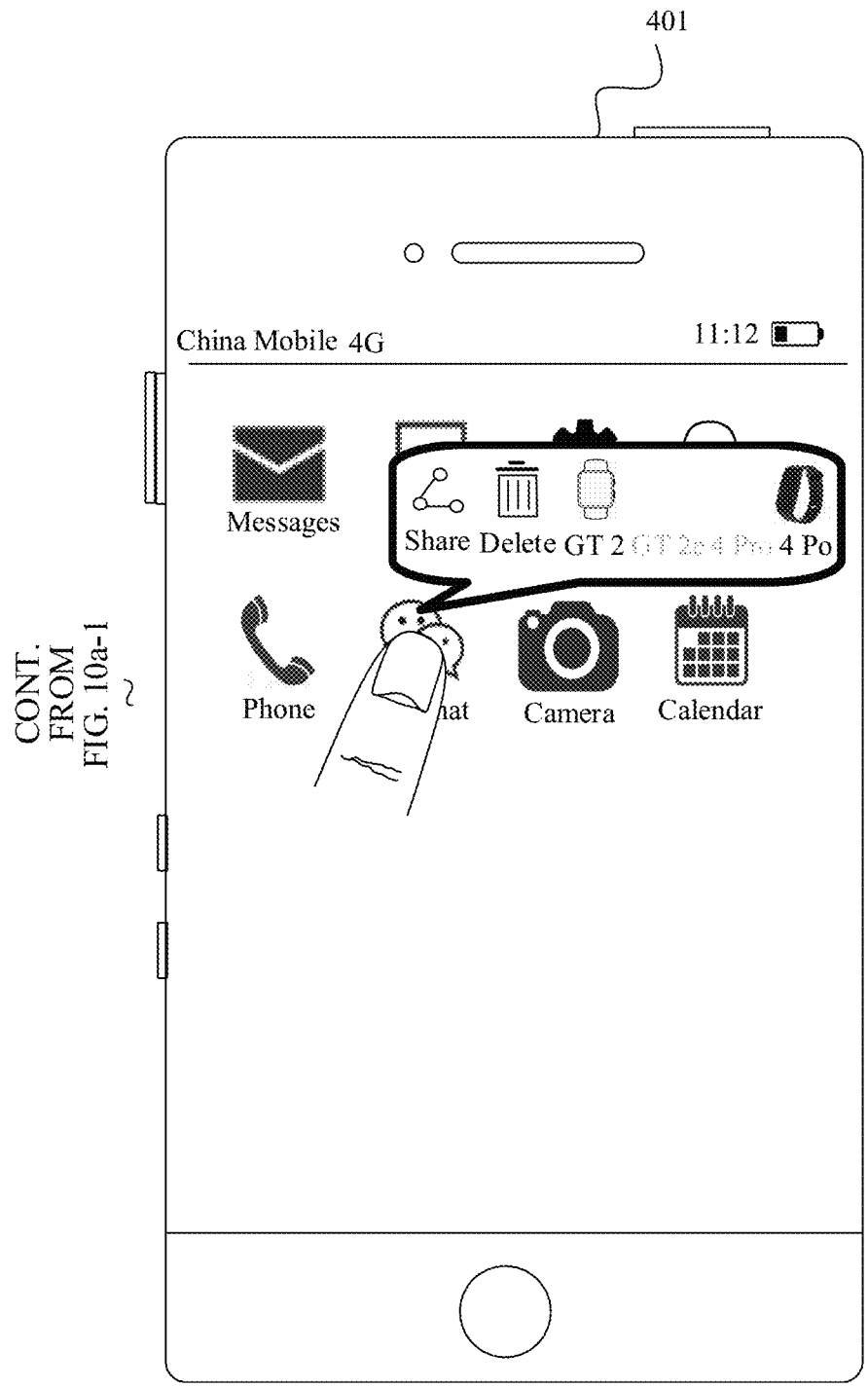
Figures 1, 10B:
Figures 2, 10B:
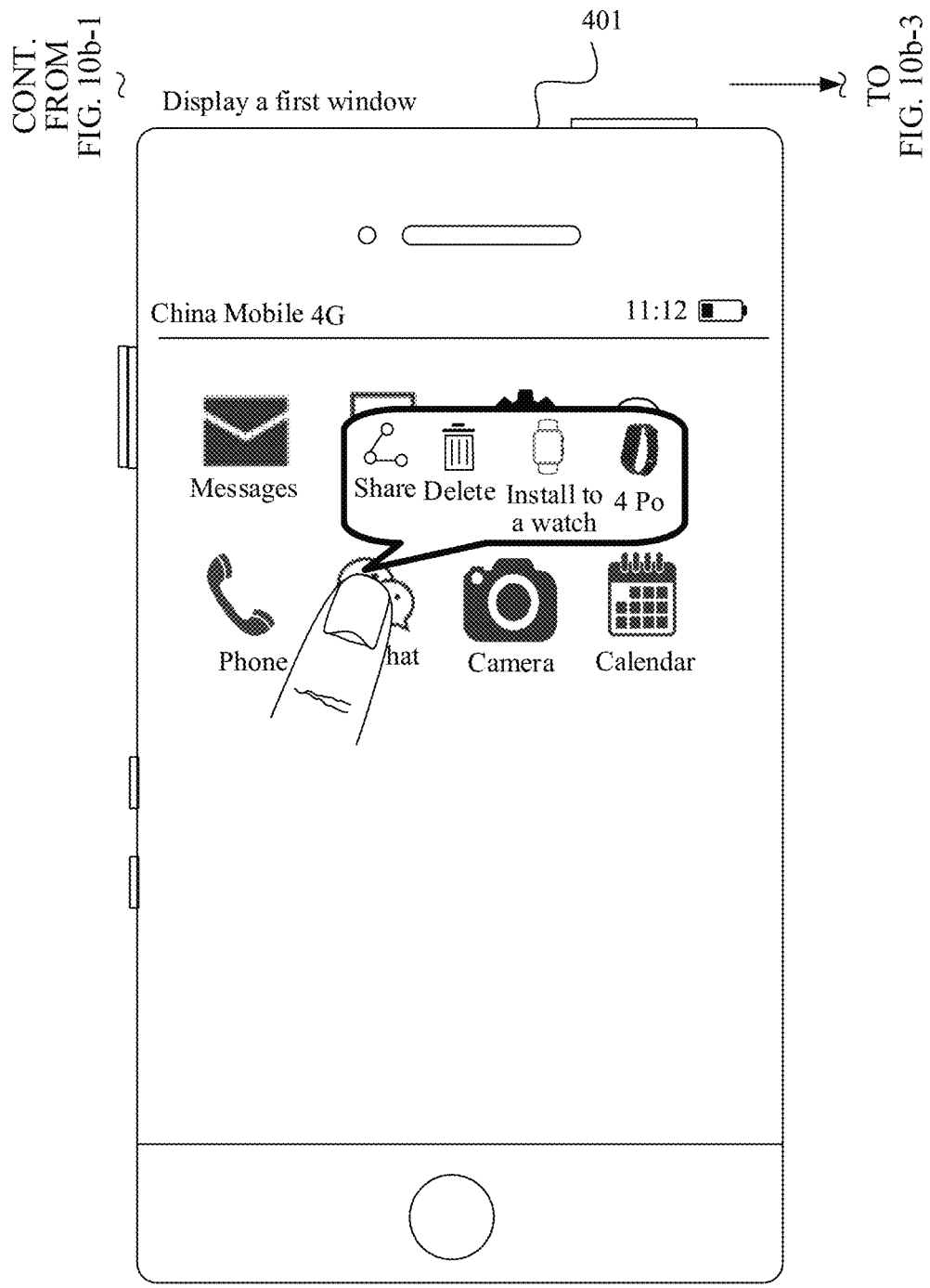
Figures 3, 10B:
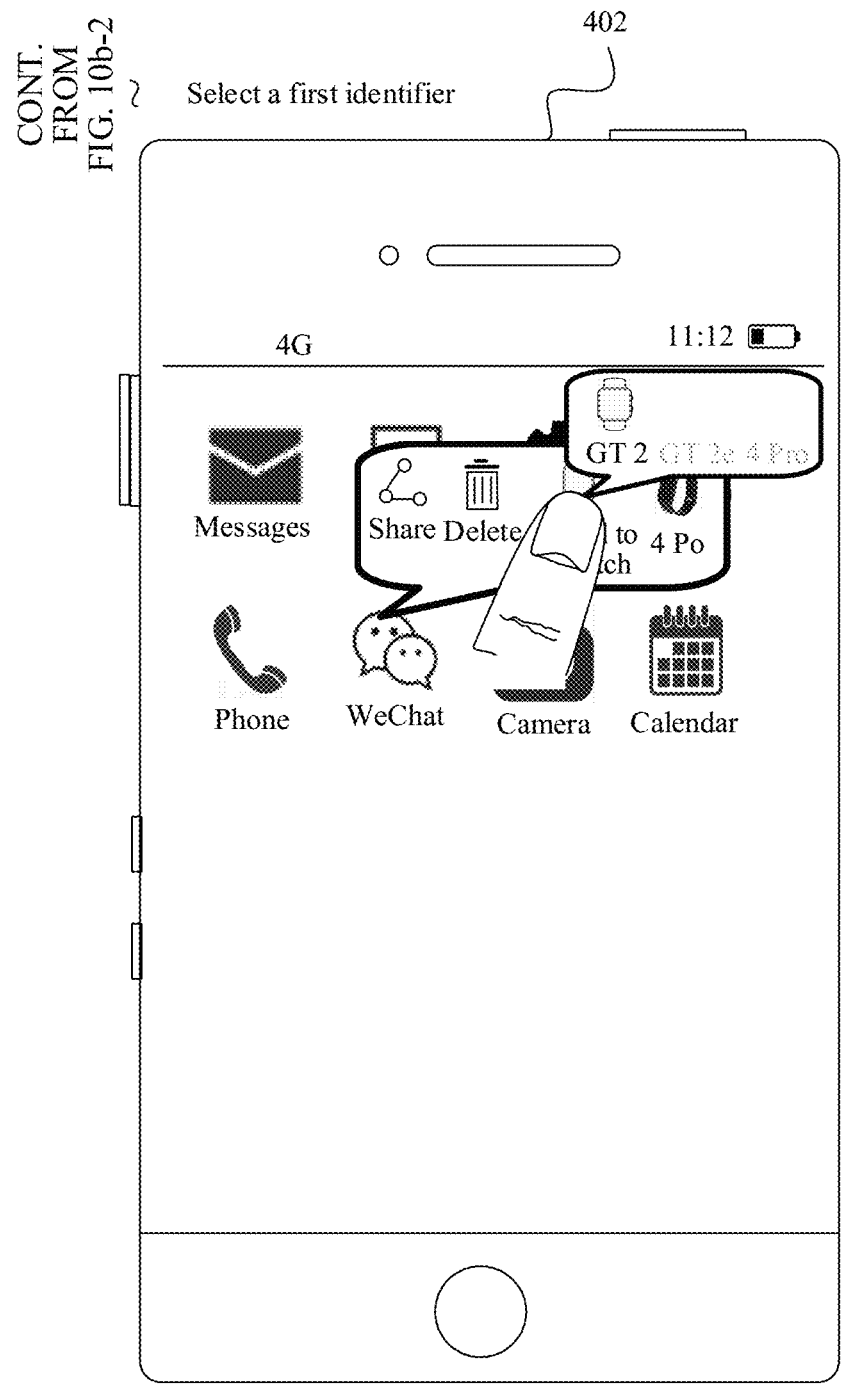

FIG. 10a-1 and FIG. 10a-2 are schematic diagrams of a manner of displaying a first identifier according to an embodiment of this disclosure. FIG. 10a-1 and FIG. 10a-2 include an interface 400 and an interface 401.

Operation 1: A mobile phone receives a first operation triggered by a user on a target application icon on the interface 400.

Operation 2: It is assumed that a wearable device corresponding to the first identifier included in a first window is a device previously connected to the mobile phone, in response to the first operation, determine whether the wearable device corresponding to a to-be-displayed first identifier is connected to the mobile phone, and display the first window.

Referring to the interface 401, if the wearable device corresponding to the first identifier is connected to the mobile phone, the first identifier in the first window is in an enabling state. If the wearable device corresponding to the first identifier is not connected to the mobile phone, the first identifier in the displayed first window is in a disabling state.

The user may determine, by using a display state of a target first identifier in the interface 401, whether a target wearable device is connected to the mobile phone. If the target wearable device is not connected to the mobile phone, a connection may be manually established. After the connection is successfully established, the display state of the target first identifier in the first window is converted to the enabling state.

When the mobile phone detects that the target first identifier is selected in the first window, the mobile phone sends first indication information to a target second terminal device corresponding to the target first identifier.

In an embodiment, the first identifier may be selected in both of the disabling state and the enabling state, but when the first terminal device responds to a selection operation, the first terminal device may send different indications based on a state of the first identifier. For example, if the target first identifier is in the enabling state, the first indication information is sent to a target second terminal device corresponding to the target first identifier, to indicate the target second terminal device to install a target application. For another example, when the first terminal device responds to an operation of selecting the target first identifier, if the target first identifier is in the disabling state, the first terminal device sends second indication information to a target second terminal device corresponding to the target first identifier, to indicate the target second terminal device to establish a connection to the first terminal device.

In an embodiment, in the foregoing operation 2, the mobile phone may further dynamically adjust, based on a quantity of detected wearable devices that have a binding relationship (e.g., connected or paired) with the mobile phone, a manner of displaying the first window. For example, a first-level menu displays a preset identifier (the second identifier) corresponding to wearable devices that have a binding relationship (e.g., connected or paired) with the mobile phone, and a second-level menu displays a detected wearable device that is connected to the mobile phone and that has the binding relationship with the mobile phone. Refer to FIG. 10b-1, FIG. 10b-2, and FIG. 10b-3, and for details, refer to specific descriptions of FIG. 7A, FIG. 7B, FIG. 7C, FIG. 7D, and FIG. 7E or FIG. 8A, FIG. 8B, and FIG. 8C. Details are not described herein again.

Embodiments of this disclosure further provide another manner of displaying the first identifier, to represent whether a second terminal device corresponding to the first identifier is connected to the first terminal device.

Figure 11A:
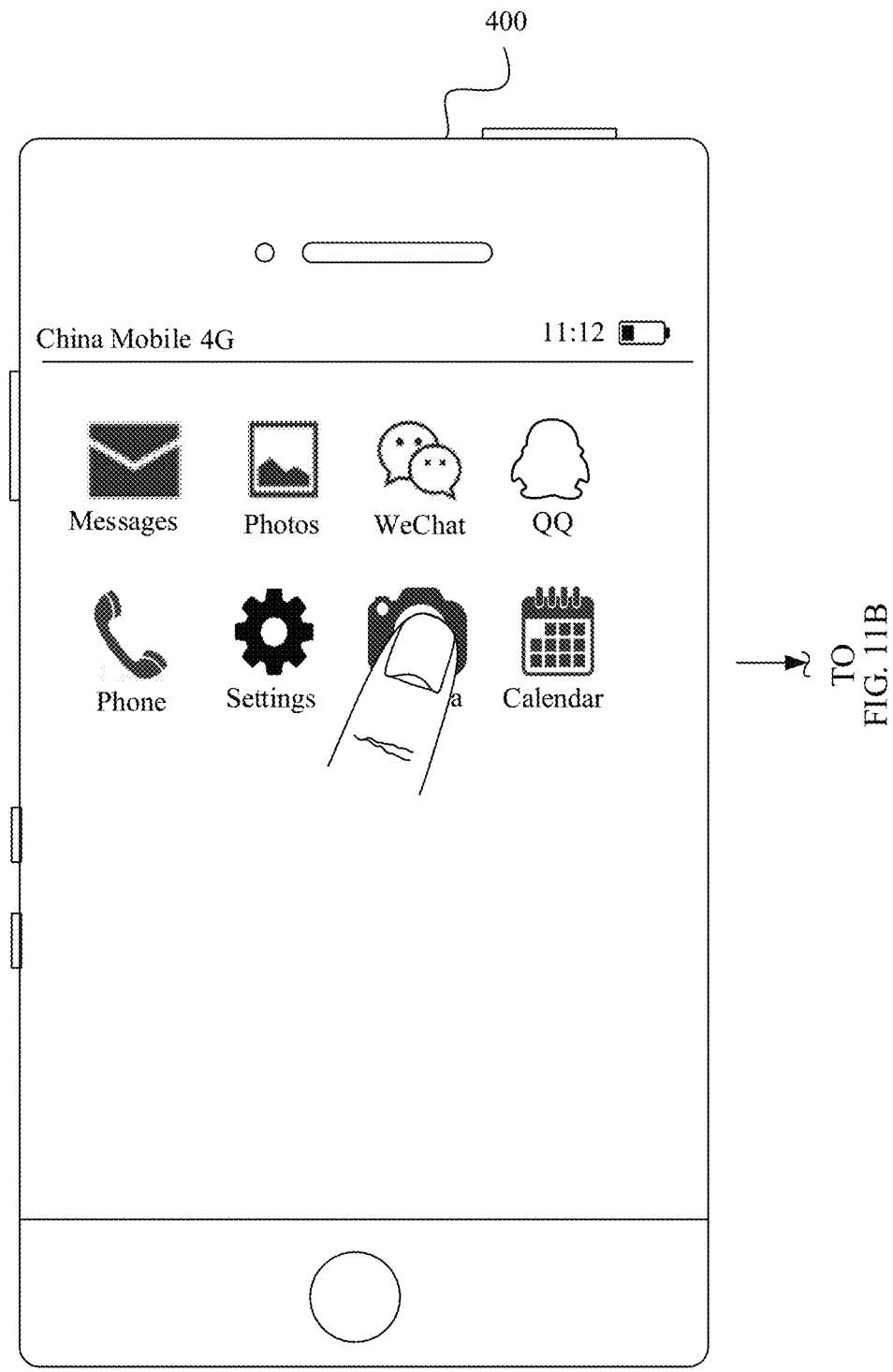
FIG. 11A and FIG. 11B are schematic diagrams of another group of interfaces for displaying a first identifier according to an embodiment of this disclosure.
Figure 11B:
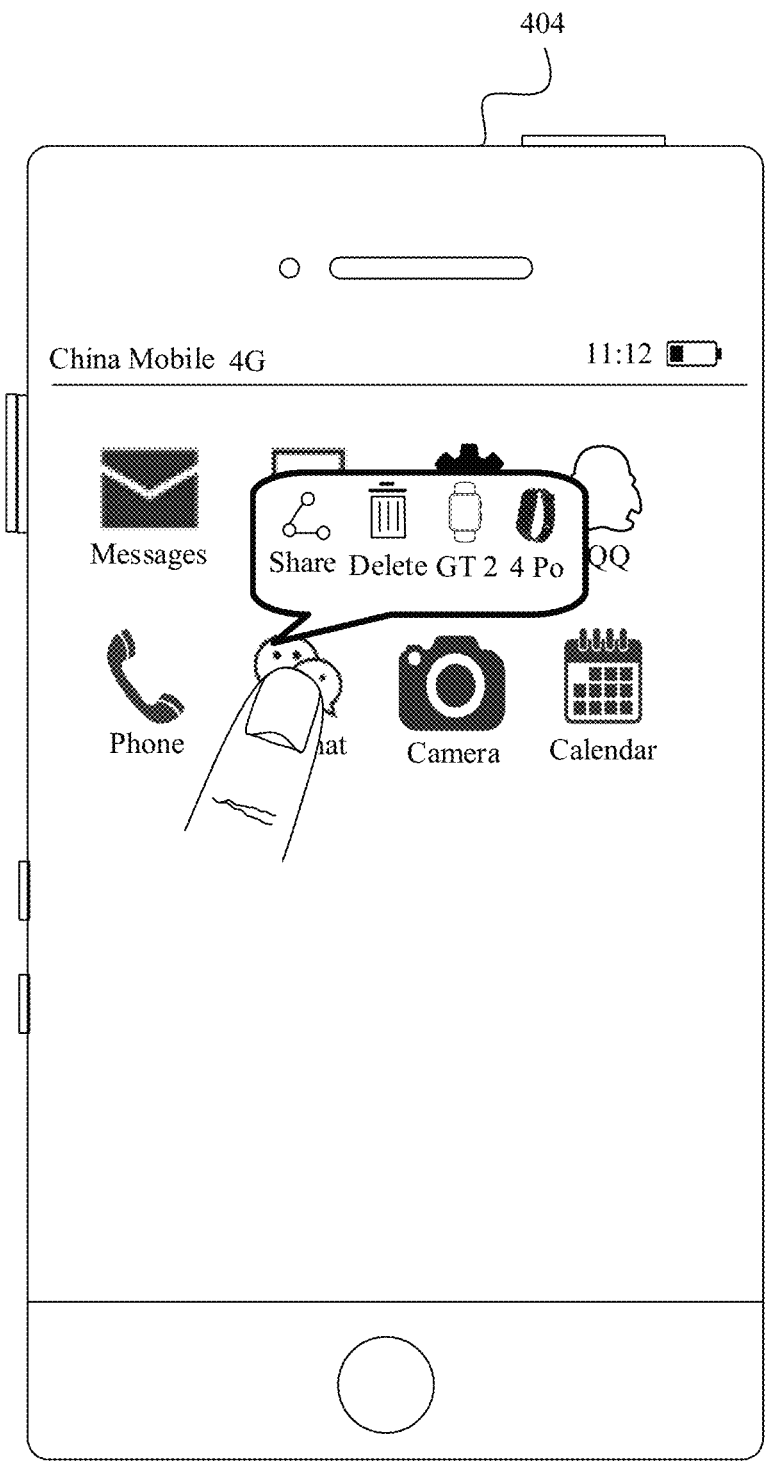

FIG. 11A and FIG. 11B are schematic diagrams of another manner of displaying a first identifier according to an embodiment of this disclosure. FIG. 11A and FIG. 11B include an interface 400 and an interface 404.

Operation 1: A mobile phone receives a first operation triggered by a user on a target application icon on the interface 400.

Operation 2: In response to the first operation, determine whether a wearable device corresponding to a to-be-displayed first identifier is connected to the mobile phone, and display, in the first window, a first identifier corresponding to the connected wearable device.

It is assumed that the wearable device corresponding to the first identifier included in the first window is a device previously connected to the mobile phone. For example, the wearable device may include wearable devices whose names are GT 2, GT 2e, 4 Pro, and 4 Po.

If it is detected that the mobile phone is connected to wearable devices named GT 2 and 4 Po, first identifiers corresponding to the wearable devices are displayed in the first window. Devices that are not connected to the mobile phone are not displayed in the first window.

Embodiments of this disclosure further provide another manner of displaying the first identifier, to represent whether a second terminal device corresponding to the first identifier is connected to the first terminal device.

Figure 12:
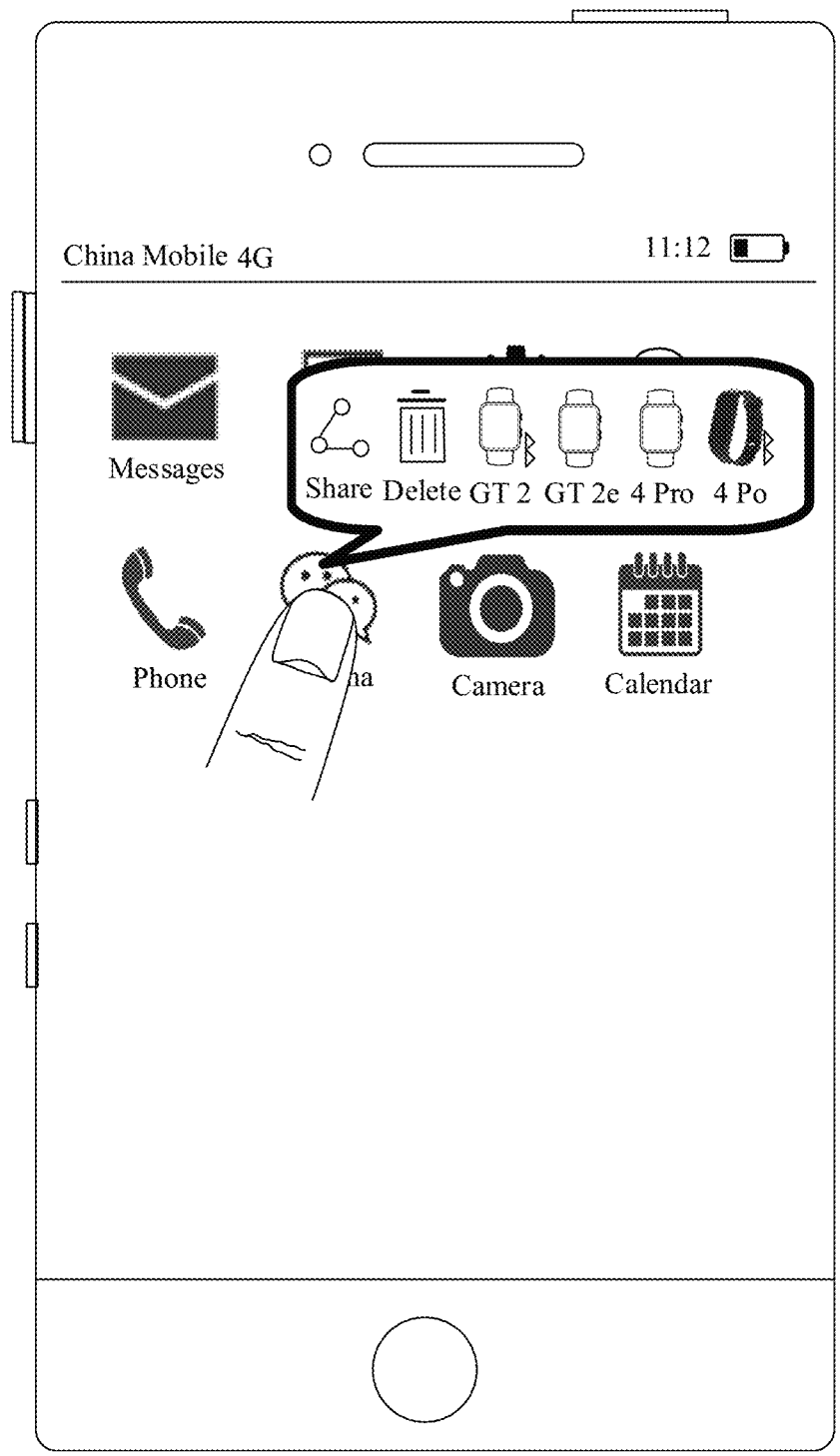
FIG. 12 is a schematic diagram of an interface for displaying a first window according to this disclosure.

FIG. 12 is a schematic diagram of another manner of displaying a first identifier according to an embodiment of this disclosure. FIG. 12 includes an interface 601 and an interface 602.

For example, if a wearable device corresponding to the first identifier is connected to a first terminal device by using Bluetooth, a Bluetooth connection identifier is displayed. If the wearable device corresponding to the first identifier is not connected to the first terminal device by using Bluetooth, the Bluetooth connection identifier is not displayed. In an embodiment, the first window may display a first identifier corresponding to a second terminal device, as shown in FIG. 12. Alternatively, the first identifier corresponding to the second terminal device is not displayed in the first window.

It should be noted that FIG. 12 is merely an example, and a location and an icon for displaying the connection identifier are not limited in this embodiment of this disclosure.

The first window is displayed in a pop-up window manner. In an embodiment of this disclosure, the first window may alternatively be displayed at a fixed location on a display screen of the mobile phone. The following describes a procedure of another method for controlling installation of an application program with reference to another manner of displaying the first window.

Figure 13A:
FIG. 13A, FIG. 13B, and FIG. 13C are schematic diagrams of another group of interfaces according to an embodiment of this disclosure.
Figure 13B:
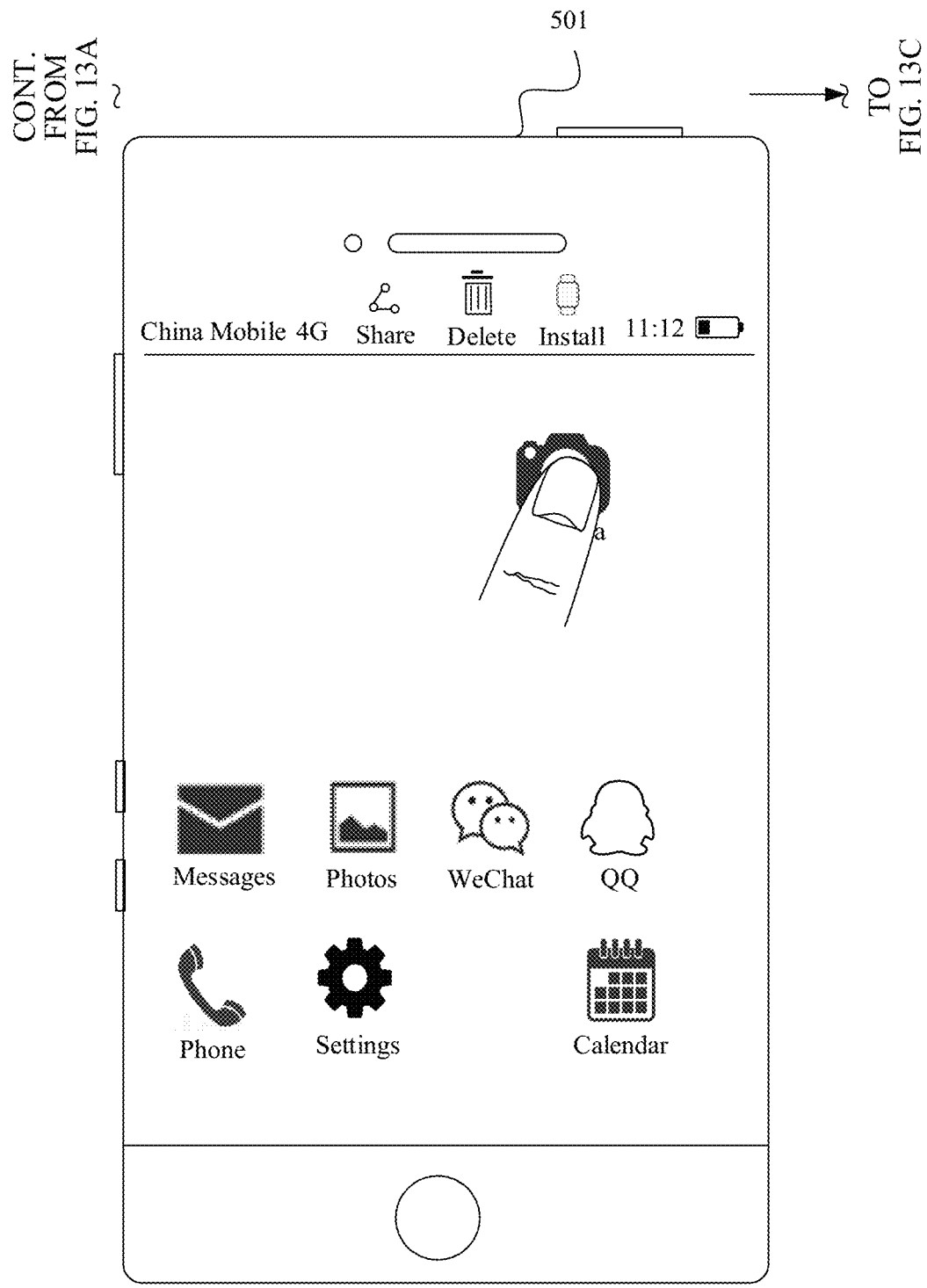
Figure 13C:
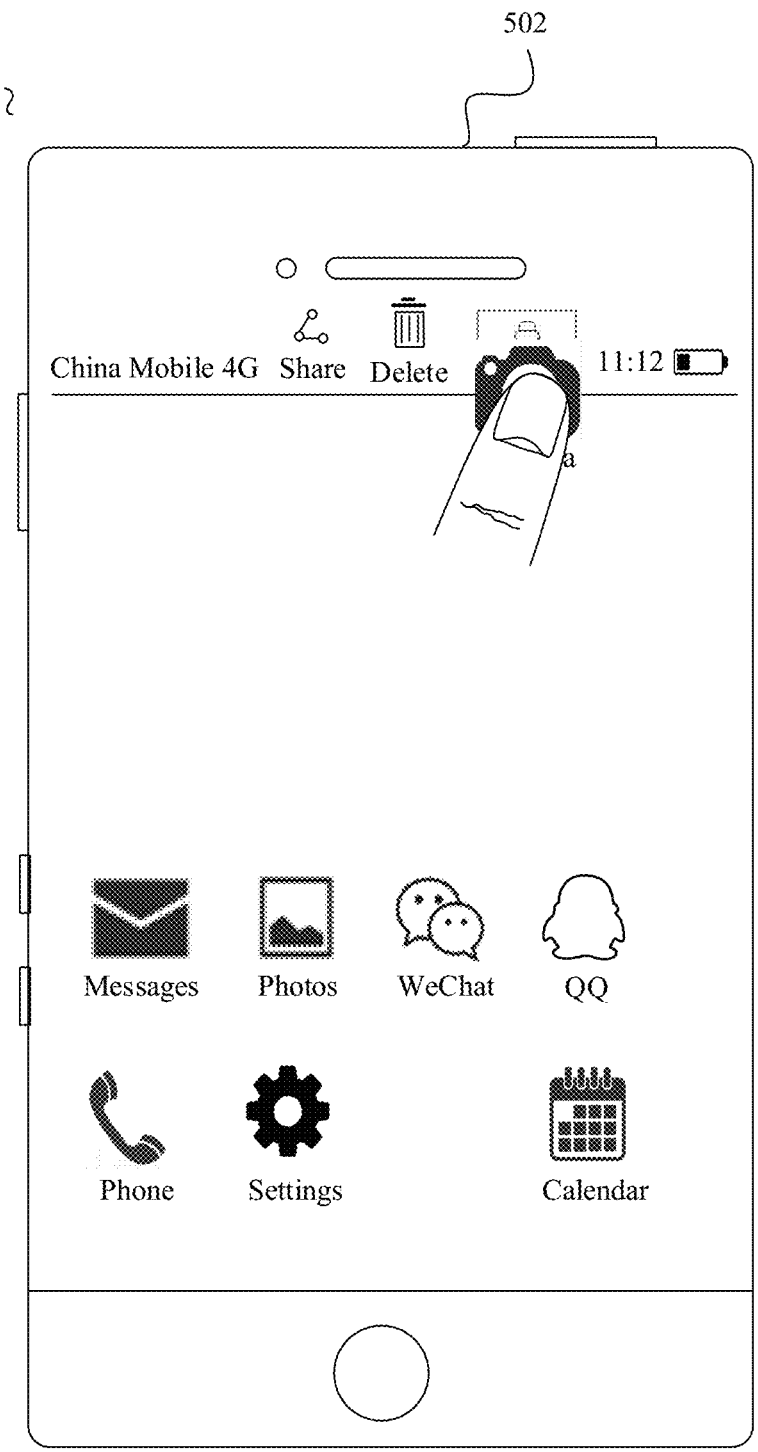

FIG. 13A, FIG. 13B, and FIG. 13C are other schematic flowcharts of controlling installation of an application program of a terminal device according to an embodiment of this disclosure. FIG. 13A, FIG. 13B, and FIG. 13C include an interface 500, an interface 501, and an interface 502.

As shown in FIG. 13A, a mobile phone receives a dragging operation performed by a user on a target application icon shown in the interface 500 in FIG. 13A. Specifically, the dragging operation may be that the user selects (for example, taps or touches and holds) the target application icon, and moves the icon to different locations when the application icon is in a selected state.

In response to the dragging operation, the mobile phone displays a first window at a preset location on a display screen of the mobile phone shown in the interface 501. Specifically, the preset location may be the top of the display screen of the mobile phone, or the bottom of the display screen. The preset location for displaying the first window is not limited in this embodiment of this disclosure. For content of the first window and an identifier included in the first window, refer to the foregoing related descriptions. Details are not described herein again.

For dragging operations triggered by the user on target application icons in different locations, a location at which the mobile phone displays the first window may be fixed. For example, in an interface shown in the interface 500 in FIG. 13A, if the mobile phone detects that the user drags the "WeChat" icon (the first operation), a location at which the first window is displayed may still be the location shown in the interface 501.

Referring to the interface 502, when the mobile phone detects that a target first identifier in the first window is selected, or when the mobile phone detects that the user performs a selection operation on the target first identifier in the first window, the mobile phone sends first indication information to a target wearable device corresponding to the target first identifier. Specifically, the selection operation may be that the user drags the target application icon to any location in an effective range of the target first identifier in the first window. It should be understood that in a process from the interface 500 to the interface 502, that is, before the user drags the target application icon to the effective range of the first identifier, the user should not release the target application icon.

The following describes a manner of closing the first window in this scenario by using an example. For example, the user drags the target application icon to a watch icon in the first window shown in the interface 302, that is, the watch icon is selected. In an embodiment, the mobile phone responds to the selection operation, sends the first indication information to a smartwatch corresponding to the watch icon, and closes the first window at the same time. In another embodiment, the first window has time validity. Specifically, the first window is always displayed within a validity time of the first window. It is assumed that the validity time is 10 minutes, the first window is not closed within the 10 minutes. In the interface 502, after the user drags a camera icon to the target first identifier of the first window, the user may further continue to drag another application icon, for example, a WeChat icon, in the interface 502 to the first identifier of the first window, to install one or more target applications on the target wearable device.

The foregoing manner ensures that the user separately installs one or more application programs on a second terminal device by using the same first window. The user does not need to repeatedly trigger a preset operation on different target application icons, and one or more target application programs may be flexibly selected and installed on the second terminal device. This simplifies a manner in which a plurality of application programs need to be installed on the second terminal device.

It should be noted that this example is different from the foregoing example in which the first window is displayed in the pop-up window manner in terms of the first operation and the location at which the first window is displayed. For other procedures, refer to specific descriptions of the foregoing example. For example, the first window is displayed in a form of a multi-level menu in FIG. 13A, FIG. 13B, and FIG. 13C. Details are not described herein again.

Finally, in an embodiment of this disclosure, a process in which the first terminal device indicates, by using the first indication information, the second terminal device to install the target application program is described in detail.

In an embodiment, the first terminal device may send an installation package of the target application to the target second terminal device. Specifically, the first indication information indicates the target second terminal device to install the target application by using the installation package of the target application that is sent by the first terminal device.

For example, the installation package of the target application may be downloaded by the first terminal device from an application store of the first terminal device.

For example, the target application program is "WeChat", the first terminal device is a mobile phone, and the second terminal device is a smartwatch. The mobile phone may download, from an application store installed on the mobile phone, a WeChat version adapted to installation (running) of the smartwatch, and send the downloaded installation package of the WeChat version to the smartwatch. After the smartwatch receives the installation package of the WeChat version, the smartwatch installs WeChat. It should be understood that a name of the application store is merely an example. In different first terminal devices, names of apps configured to provide an application download function may be different.

It should be noted that the first indication information and the installation package of the target application may be sent to the target second terminal device at the same time, the first indication information may be sent after the installation package is sent to the target second terminal device, or the first indication information is sent to the target second terminal device before the installation package is sent. This is not limited in this embodiment of this disclosure.

For another example, the installation package of the target application may also be a target application that is generated by the first terminal device and that is adapted to the target second terminal device. Specifically, the first terminal device may reconstruct, based on an installation file that is of the target application and that is adapted to the first terminal device and differentiated files that are of the first terminal device and the second terminal device and that are related to the target application, the installation package adapted to the second terminal device.

The following uses an example in which the first terminal device is a mobile phone and the second terminal device is a smartwatch, to provide an example of a process in which the first terminal device generates an installation package adapted to the second terminal device.

(1) Create a folder named wear (watch) in a phone system. It should be understood that an initial state of the folder is an empty folder.

(2) Migrate a source file of a target application program in the mobile phone to the wear folder. The migration may be completed through cutting, copying, or the like.

(3) A wear module (which may also be a file) is generated in a root directory of the target application program in the mobile phone.

(4) Add, to the wear module, code that supports a feature of the watch and a dependency library file of the watch, and copy a source code part that is in the source file of the target application program and that is stored in the wear folder to the wear module.

It should be noted that the wear folder may not be created, and the source code is directly copied from a source file of a template application program to the wear module.

(5) Replace an application programming interface (application programming interface, API) in the wear module with an API adapted to a watch application.

(6) Scale an overall page layout of the target application program according to a corresponding ratio of the mobile phone to the watch; or first identify all unit controls on a page included in the target application program, and then scale down each unit control (for example, a function button, an icon, or a text) to a size that conforms to a screen width of the watch, and arrange the unit controls according to a layout of the target application program in the mobile phone. Optionally, the unit controls may be re-arranged according to importance of the unit controls.

It should be noted that the foregoing reconstruction procedure may also be executed by the second terminal device or a third party (for example, a server). For example, the server may further generate an installation package of the target application program adapted to the second terminal device, and after the first terminal device receives the installation package from the third party, the first terminal device sends the installation package to the second terminal device in a short-distance communication manner. Alternatively, the second terminal device obtains the installation package from the third party by using a communication module of the second terminal device. Alternatively, the second terminal device may generate the installation package of the target application program. This is not limited in this embodiment of this disclosure.

In another optional implementation, the first terminal device may send related information of the target application program to the target second terminal device, where the related information of the target application includes a name of the target application, or a name of the target application and version information of the target application. Specifically, the first indication information indicates the target second terminal device to download the installation package of the target application by using the related information that is of the target application and that is sent by the first terminal device, and install the target application by using the installation package.

Correspondingly, the second terminal device receives the related information of the target application program from the first terminal device, and downloads, according to the name and the version information of the target application program, the target application program from the application store installed by the second terminal device, and installs the target application program.

It should be noted that the version information sent by the first terminal device to the second terminal device may be version information of the target application program that is running on the first terminal device. Alternatively, before the first terminal device sends the related information, the first terminal device may further detect whether the version information is a latest version of the target application program. If the version information is not the latest version of the target application program, the first terminal device may further display a notification box before the first terminal device sends the version information to the second terminal device. The notification box is used to notify the user that a current version of the target application program is not the latest version, whether to update the version of the target application program, send latest version information of the target application program to the second terminal device, or still send the current version information, and then the first terminal device performs in a manner selected by the user.

For further optimization, the related information of the target application program may further include configuration information of the target application program, where the configuration information of the target application program may refer to the configuration information of the target application program in the first terminal device. For example, the target application program is WeChat, the configuration information of WeChat in the first terminal device includes but is not limited to setting information of WeChat, for example, information such as a privacy setting, a general setting, and a chat setting. The second terminal device may configure the target application program according to the configuration information from the first terminal device. This improves efficiency of configuring an application program on the second terminal device, simplifies user operations, and improves user experience.

The implementations of this disclosure may be combined randomly to achieve different technical effects.

Figure 14:
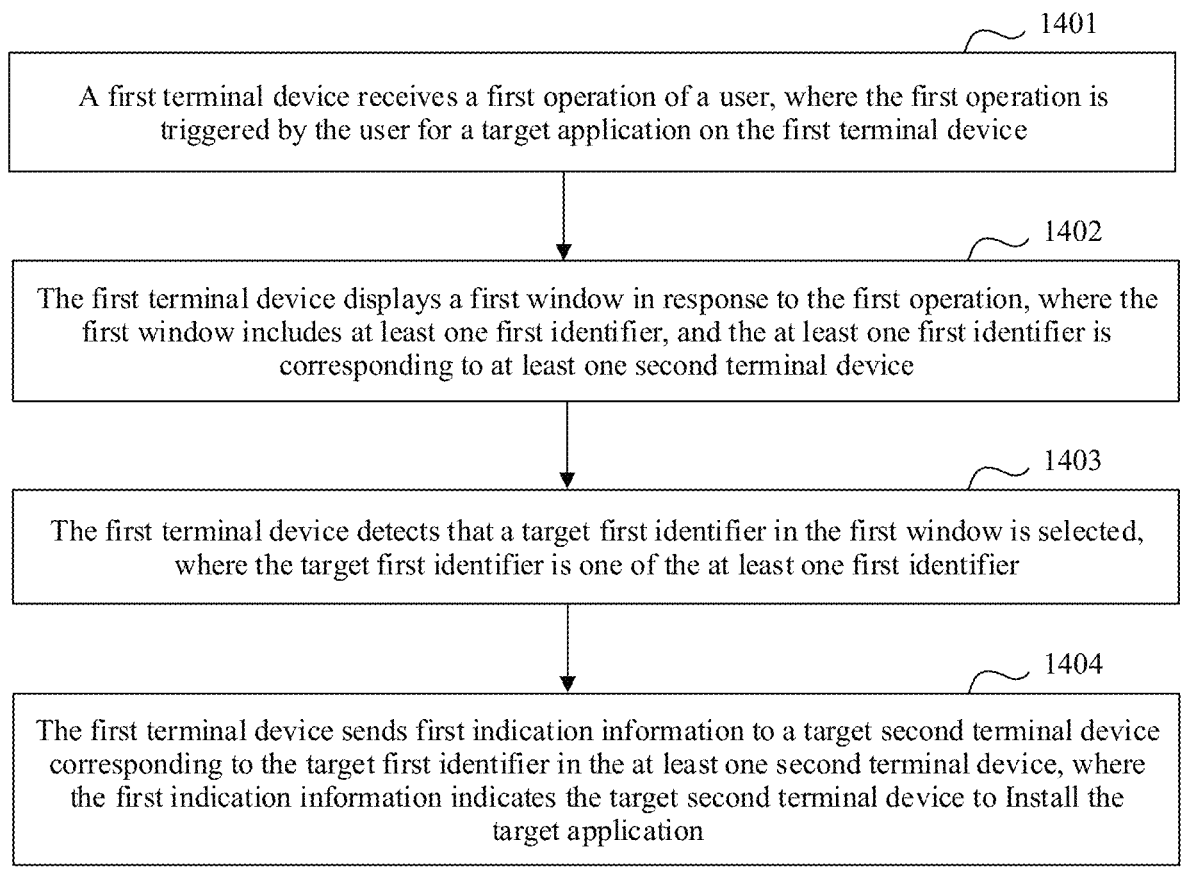
FIG. 14 is a schematic flowchart corresponding to a method for controlling installation of an disclosure program according to an embodiment of this disclosure.

Based on the foregoing description, an embodiment of this disclosure further provides a method for controlling installation of an application program. As shown in FIG. 14, the method may include the following operations:

Operation 1401: A first terminal device receives a first operation of a user, where the first operation is triggered by the user for a target application on the first terminal device.

The first operation may be a touch control operation shown in FIG. 3A to FIG. 13A, or may be a voice instruction. For example, a voice assistant application receives voice information "displaying a first window on a target application icon" sent by the user.

Operation 1402: The first terminal device displays a first window in response to the first operation, where the first window includes at least one first identifier, and the at least one first identifier corresponds to at least one second terminal device.

The first terminal device may display the first window based on a type of the first operation. For example, if the first operation is a tap operation or a touch-and-hold operation shown in FIG. 3A, or a slide operation shown in FIG. 4A, FIG. 4B, or FIG. 4C, the first terminal device responds to the first operation, and may display the first window near a target application icon in a pop-up window manner.

For another example, if the first operation is a dragging operation shown in FIG. 13A, the first terminal device responds to the first operation, and may display the first window at a preset location of a display screen of the first terminal device.

In an embodiment, the first terminal device may display the first window in a preset manner, where the first window may be a first-level menu, or the first window may be an N-level menu. A to-be-displayed first identifier in the first-level menu may be an identifier corresponding to a second terminal device that has a binding relationship (e.g., connected or paired) with the first terminal device. Alternatively, the first terminal device may display the first window according to a quantity of detected second terminal devices connected to the first terminal device. For example, if it is detected that a plurality of (a preset quantity) smartwatches are connected to the mobile phone, the plurality of smartwatches may be displayed in a form of a second-level menu. The first-level menu includes a second identifier for triggering the second-level menu, and the second identifier may be a preset identifier, or an identifier of one of a plurality of second terminal devices in the second-level menu. For details, refer to FIG. 7A, FIG. 7B, FIG. 7C, FIG. 7D, and FIG. 7E or FIG. 8A, FIG. 8B, and FIG. 8C. Details are not described herein again.

Operation 1403: The first terminal device detects that a target first identifier in the first window is selected, where the target first identifier is one of the at least one first identifier.

Operation 1404: The first terminal device sends first indication information to a target second terminal device that is in the at least one second terminal device and that is corresponding to the target first identifier, where the first indication information indicates the target second terminal device to install the target application.

If the first terminal device detects a selection operation performed by the user on the target first identifier in the first window, for example, a tapping operation in FIG. 7A or a selection operation in FIG. 8B, the first terminal device separately sends the first indication information to one or more target second terminal devices corresponding to selected one or more target first identifiers.

In an embodiment, if the target second terminal device is not connected to the first terminal device, before the first terminal device sends the first indication information, the first terminal device sends second indication information to the target second terminal device, to indicate the target second terminal device to establish a connection to the first terminal device. After the second terminal device successfully establishes s connection to the first terminal device, the first terminal device sends the first indication information to the target second terminal device, to indicate the target second terminal device to install the target application. For a specific procedure of indicating the target second terminal device to install the target application, refer to the foregoing embodiment. Details are not described herein again.

In the foregoing embodiments provided in this disclosure, the method provided in embodiments of this disclosure is described from a perspective of the first terminal device serving as an execution body. To implement functions in the method provided in embodiments of this disclosure, an electronic device may include a hardware structure and/or a software module, and implement the functions in a form of the hardware structure, the software module, or a combination of the hardware structure and the software module. Whether a function in the foregoing functions is performed by using the hardware structure, the software module, or the combination of the hardware structure and the software module depends on particular applications and design constraints of the technical solutions.

Figure 15:
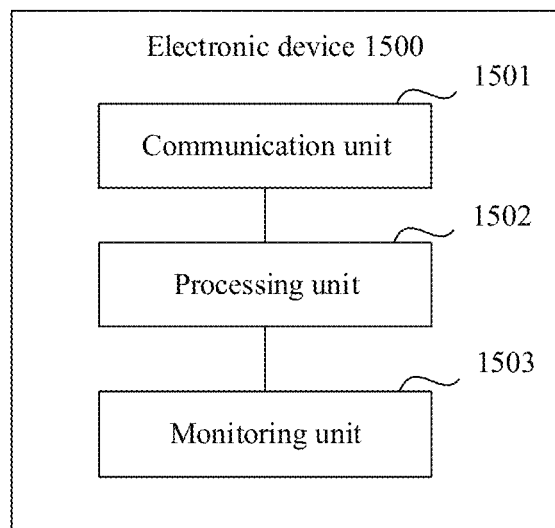
FIG. 15 is a schematic diagram of a structure of an electronic device according to an embodiment of this disclosure.

Based on the foregoing embodiments and a same idea, FIG. 15 is a schematic diagram of an electronic device according to an embodiment of this disclosure. As shown in FIG. 15, an electronic device 1500 may be a chip or a circuit, for example, a chip or a circuit that may be disposed in the electronic device.

As shown in FIG. 15, the electronic device 1500 may include a communication unit 1501, a processing unit 1502, and a monitoring unit 1503. The communication unit 1501 may further include a sending unit and a receiving unit.

In an embodiment, the receiving unit is configured to receive a first operation of a user, where the first operation is triggered by the user for a target application on a first terminal device.

The processing unit 1502 is configured to display a first window in response to the first operation, where the first window includes at least one first identifier, and the at least one first identifier corresponds to at least one second terminal device.

The monitoring unit 1503 is configured to detect that a target first identifier in the first window is selected, where the target first identifier is one of the at least one first identifier.

The sending unit is configured to send first indication information to a target second terminal device that is in the at least one second terminal device and that is corresponding to the target first identifier, where the first indication information indicates the target second terminal device to install the target application.

In an embodiment, the processing unit 1502 displays the first window, and the processing unit 1502 is configured to: display the first window on an icon of the target application in a pop-up window manner; or display the first window at a preset location on a display screen.

In an embodiment, the at least one second terminal device is separately bound (e.g., connected or paired) to the electronic device.

In an embodiment, the first identifier has one display state; or the first identifier has two display states, when a second terminal device corresponding to the first identifier is connected to the first terminal device, the first identifier in the first window is in a first display state; or when a second terminal device corresponding to the first identifier does not establish a connection to the first terminal device, the first identifier in the first window is in a second display state.

In an embodiment, the first identifier has one display state. After the monitoring unit detects that the target first identifier in the first window is selected, and before the sending unit sends the first indication information to the target second terminal device, the processing unit 1502 is further configured to: determine that the first terminal device is connected to the target second terminal device; or determine that the first terminal device does not establish a connection to the target second terminal device, send second indication information to the target second terminal device, where the second indication information indicates the target second terminal device to establish a connection to the first terminal device.

In an embodiment, the processing unit 1502 is configured to: display a second window in response to the first operation, where the second window includes a second identifier; and display the first window in response to a selection operation performed by the user on the second identifier.

In an embodiment, the sending unit is further configured to: before the sending unit sends the first indication information to the target second terminal device, or after the sending unit sends the first indication information to the target second terminal device, send an installation package of the target application to the target second terminal device.

In an embodiment, the processing unit 1502 is further configured to: download the installation package of the target application, where the installation package is in a format supported by the target second terminal device; or convert a format of the installation package that is of the target application and that is adapted to the electronic device into a format supported by the target second terminal device.

In an embodiment, the sending unit is further configured to: before the sending unit sends the first indication information to the target second terminal device, or after the sending unit sends the first indication information to the target second terminal device, send related information of the target application to the target second terminal device, where the related information of the target application includes a name of the target application, or the related information of the target application includes a name and version information of the target application.

In an embodiment, the sending unit is further configured to: before the sending unit sends the first indication information to the target second terminal device, or after the sending unit sends the first indication information to the target second terminal device, send configuration information of the target application to the target second terminal device, so that the target second terminal device configures the installed target application based on the configuration information of the target application.

Figure 16:
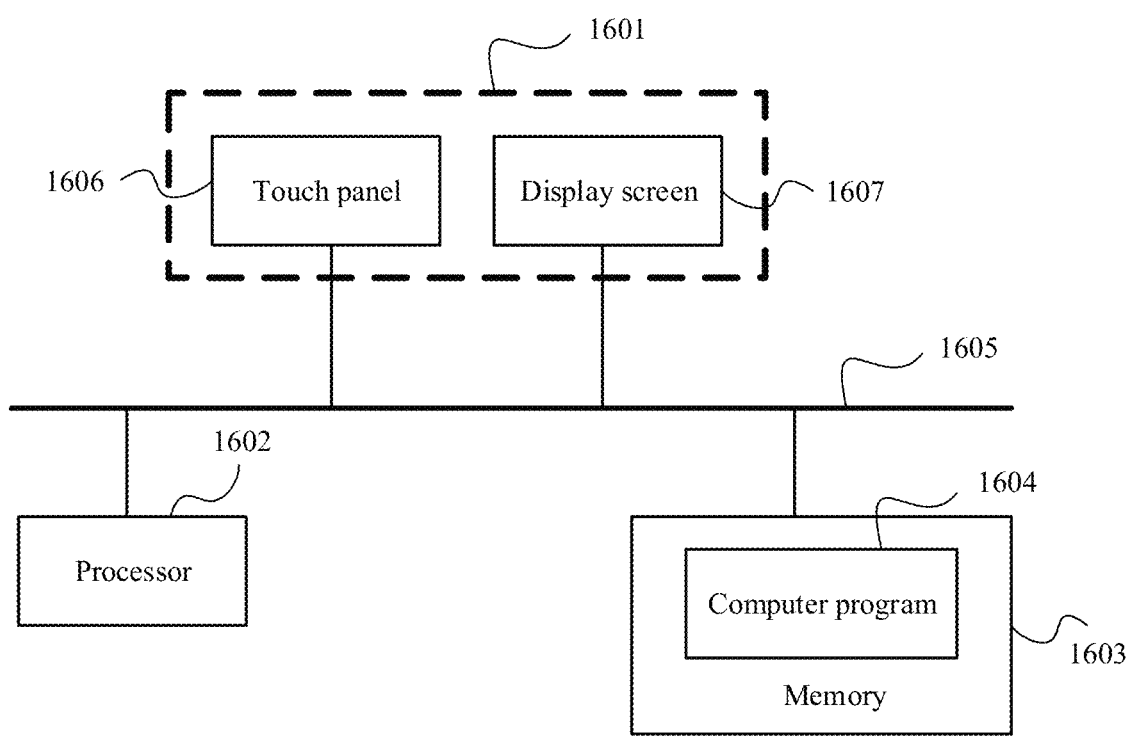
FIG. 16 is a schematic diagram of a structure of another electronic device according to an embodiment of this disclosure.

In some other embodiments of this disclosure, an embodiment of this disclosure discloses a terminal device. As shown in FIG. 16, the electronic device may include a touchscreen 1601, where the touchscreen 1601 includes a touch panel 1606 and a display screen 1607, one or more processors 1602, a memory 1603, one or more application programs (not shown), and one or more computer programs 1604. The foregoing components may be connected through one or more communication buses 1605. The one or more computer programs 1604 are stored in the memory 1603, and are configured to be executed by the one or more processors 1602. The one or more computer programs 1604 include instructions, and the instructions may be used to perform the operations in FIG. 14 and the corresponding embodiments.

An embodiment of this disclosure further provides a computer storage medium. The computer storage medium stores computer instructions. When the computer instructions are run on a terminal device, the terminal device is enabled to perform the foregoing related method operations to implement the methods in the foregoing embodiments.

An embodiment of this disclosure further provides a computer program product. When the computer program product is run on a computer, the computer is enabled to perform the foregoing related operations to implement the method in the foregoing embodiment.

In addition, an embodiment of this disclosure further provides an apparatus. The apparatus may be a chip, a component, or a module. The apparatus may include a processor and a memory that are connected. The memory is configured to store computer-executable instructions. When the apparatus runs, the processor may execute the computer-executable instructions stored in the memory, to enable the chip to perform the methods in the foregoing method embodiments.

The terminal device, the computer storage medium, the computer program product, or the chip in embodiments of this disclosure is configured to perform a corresponding method provided above. Therefore, for beneficial effects that can be achieved, refer to the beneficial effects in the corresponding methods provided above. Details are not described herein again.

Based on descriptions of the foregoing implementations, a person skilled in the art may understand that, for the purpose of convenient and brief descriptions, division into the foregoing functional modules is merely used as an example for description. In an actual application, the foregoing functions can be allocated to different functional modules and implemented based on a requirement. In other words, an internal structure of an apparatus is divided into different functional modules to implement all or some of the functions described above.

In the several embodiments provided in this disclosure, it should be understood that the disclosed apparatus and method may be implemented in other manners. For example, the described apparatus embodiment is merely an example. For example, division into modules or units is merely logical function division and may be other division during an actual implementation. For example, a plurality of units or components may be combined or integrated into another apparatus, or some features may be discarded or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of embodiments.

In addition, functional units in embodiments of this disclosure may be integrated into one processing unit, each of the units may exist alone physically, or two or more units may be integrated into one unit. The integrated unit may be implemented in a form of hardware, or may be implemented in a form of a software functional unit.

When the integrated unit is implemented in a form of a software functional unit and sold or used as an independent product, the integrated unit may be stored in a readable storage medium. Based on such an understanding, the technical solutions of embodiments of this disclosure essentially, or the part contributing to the conventional technology, or all or some of the technical solutions may be implemented in a form of a software product. The software product is stored in a storage medium and includes several instructions for instructing a device (which may be a single-chip microcomputer, a chip, or the like) or a processor to perform all or some of the operations of the methods described in embodiments of this disclosure. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this disclosure, but are not intended to limit the protection scope of this disclosure. Any variation or replacement readily figured out by a person skilled in the art in the technical scope disclosed in this disclosure shall fall within the protection scope of this disclosure. Therefore, the protection scope of this disclosure shall be subject to the protection scope of the claims.

What is claimed is:

1. A method for controlling installation of an application program, comprising:
   receiving, by a first terminal device operating as a mobile device, a first operation of a user, wherein the first operation is triggered by the user for installing a target application by operating on the first terminal device;
   displaying, on the first terminal device, a first window in response to the first operation, wherein the first window comprises at least one first identifier corresponding to at least one second terminal device comprising a wearable device paired with the mobile device;

detecting, by the first terminal device, that a target first identifier in the first window is selected, wherein the target first identifier is one of the at least one first identifier; and sending, by the first terminal device, first indication information to a target second terminal device that is in the at least one second terminal device and that is corresponding to the target first identifier, wherein the first indication information instructs the target second terminal device to install the target application, wherein the first terminal device includes an application program having a same function as the target application and adapted versions of the application program and the target application are different, and wherein the first terminal device and the target second terminal device use different third-party library files for the application program and the target application.

2. The method according to claim 1, wherein displaying the first window comprises:

displaying, by the first terminal device, the first window on an icon of the target application in a pop-up window manner; or displaying, by the first terminal device, the first window at a preset location on a display screen.

3. The method according to claim 1, wherein the at least one second terminal device is individually connected to the first terminal device.

4. The method according to claim 1, wherein when a second terminal device corresponding to the first identifier is connected to the first terminal device, the first identifier in the first window is in a first display state, and wherein when a second terminal device corresponding to the first identifier does not establish a connection to the first terminal device, the first identifier in the first window is in a second display state.

5. The method according to claim 4, wherein after the first terminal device detects that the target first identifier in the first window is selected, and before the first terminal device sends the first indication information to the target second terminal device corresponding to the target first identifier, the method further comprises:

detecting, by the first terminal device, that the first terminal device is connected to the target second terminal device; or when the first terminal device detects that the first terminal device does not establish a connection to the target second terminal device, sending, by the first terminal device, second indication information to the target second terminal device to instruct the target second terminal device to establish a connection to the first terminal device; and detecting, by the first terminal device, that the first terminal device is connected to the target second terminal device.

6. The method according to claim 1, wherein displaying the first window in response to the first operation comprises:

displaying, by the first terminal device, a second window in response to the first operation, wherein the second window comprises a second identifier; and displaying, by the first terminal device, the first window in response to a selection operation performed by the user on the second identifier.

7. The method according to claim 1, further comprising:

sending, by the first terminal device, an installation package of the target application to the target second terminal device.

8. The method according to claim 7, wherein before sending the installation package of the target application to the target second terminal device, the method further comprises:

downloading, by the first terminal device, the installation package of the target application in a format supported by the target second terminal device; or converting, by the first terminal device, a format of the installation package of the target application that is adapted to the first terminal device into a format supported by the target second terminal device.

9. The method according to claim 1, further comprising:

sending, by the first terminal device, related information of the target application to the target second terminal device, wherein the related information of the target application comprises a name of the target application or a name and version information of the target application.

10. The method according to claim 1, further comprising:

sending, by the first terminal device, configuration information of the target application to the target second terminal device, so that the target second terminal device configures the installed target application based on the configuration information of the target application.

11. An electronic device operating as a first terminal device operating as a mobile device, comprising:

one or more processors; and one or more memories coupled to the one or more processors to store computer instructions, which when executed by the one or more processors, cause the first terminal device to perform operations, the operations comprising:

receiving, by the first terminal device, a first operation of a user, wherein the first operation is triggered by the user for a target application when operating on the first terminal device;

displaying, on the first terminal device, a first window in response to the first operation, wherein the first window comprises at least one first identifier corresponding to at least one second terminal device comprising a wearable device paired with the mobile device;

detecting, by the first terminal device, that a target first identifier in the first window is selected, wherein the target first identifier is one of the at least one first identifier; and sending, by the first terminal device, first indication information to a target second terminal device that is in the at least one second terminal device and that is corresponding to the target first identifier, wherein the first indication information instructs the target second terminal device to install the target application, wherein the first terminal device includes an application program having a same function as the target application and adapted versions of the application program and the target application are different, and wherein the first terminal device and the target second terminal device use different third-party library files for the application program and the target application.

12. The electronic device according to claim 11, wherein displaying the first window comprises:

displaying, by the first terminal device, the first window on an icon of the target application in a pop-up window manner; or displaying, by the first terminal device, the first window at a preset location on a display screen.

13. The electronic device according to claim 11, wherein the at least one second terminal device is individually connected to the first terminal device.

14. The electronic device according to claim 11, wherein when a second terminal device corresponding to the first identifier is connected to the first terminal device, the first identifier in the first window is in a first display state; and wherein when a second terminal device corresponding to the first identifier does not establish a connection to the first terminal device, the first identifier in the first window is in a second display state.

15. The electronic device according to claim 14, wherein after the first terminal device detects that the target first identifier in the first window is selected, and before the first terminal device sends the first indication information to the target second terminal device corresponding to the target first identifier, the method operations further comprise:
   detecting, by the first terminal device, that the first terminal device is connected to the target second terminal device; or
   when the first terminal device detects that the first terminal device does not establish a connection to the target second terminal device, sending, by the first terminal device, second indication information to the target second terminal device, wherein the second indication information instructs the target second terminal device to establish a connection to the first terminal device; and detecting, by the first terminal device, that the first terminal device is connected to the target second terminal device.

16. The electronic device according to claim 11, wherein displaying the first window in response to the first operation comprises:
   displaying, by the first terminal device, a second window in response to the first operation, wherein the second window comprises a second identifier; and
   displaying, by the first terminal device, the first window in response to a selection operation performed by the user on the second identifier.

17. The electronic device according to claim 11, wherein the operations further comprise:
   sending, by the first terminal device, an installation package of the target application to the target second terminal device.

18. The electronic device according to claim 17, wherein before sending the installation package of the target application to the target second terminal device, the operations further comprise:
   downloading, by the first terminal device, the installation package of the target application in a format supported by the target second terminal device; or
   converting, by the first terminal device, a format of the installation package of the target application that is adapted to the first terminal device into a format supported by the target second terminal device.

19. The electronic device according to claim 11, wherein the operations further comprise:
   sending, by the first terminal device, related information of the target application to the target second terminal device, wherein
   the related information of the target application comprises a name of the target application or a name and version information of the target application.

20. The electronic device according to claim 11, wherein the operations further comprise:
   sending, by the first terminal device, configuration information of the target application to the target second terminal device, so that the target second terminal device configures the installed target application based on the configuration information of the target application.

* * * * *

UNITED STATES PATENT AND TRADEMARK OFFICE
CERTIFICATE OF CORRECTION

PATENT NO. : 12,379,910 B2
APPLICATION NO. : 18/070835
DATED : August 5, 2025
INVENTOR(S) : Shanfu Li, Li Qian and Mingjie Dong Page 1 of 1

It is certified that error appears in the above-identified patent and that said Letters Patent is hereby corrected as shown below:

In the Claims

In Column 29, Claim 15, Line 17, delete "the method operations" and insert --the operations--.

Signed and Sealed this
Eleventh Day of November, 2025

John A. Squires
*Director of the United States Patent and Trademark Office*